US011521252B2

(12) United States Patent
Lerman et al.

(10) Patent No.: US 11,521,252 B2
(45) Date of Patent: Dec. 6, 2022

(54) METHOD, SYSTEM, AND NON-TRANSITORY COMPUTER READABLE MEDIUM FOR ENHANCED BUSINESS LISTINGS

(71) Applicant: Yext, Inc., New York, NY (US)

(72) Inventors: Howard Lerman, New York, NY (US);
Kevin Caffrey, Alexandria, VA (US);
Catherine Frailey, New York, NY (US);
Benjamin Berry, New York, NY (US);
Maxwell Shaw, New York, NY (US);
Marc Ferrentino, New York, NY (US);
Dan Tran, New York, NY (US);
Jonathan Kennell, New York, NY (US);
Akul Penugonda, New York, NY (US)

(73) Assignee: Yext, Inc., New York, NY (US)

( * ) Notice: Subject to any disclaimer, the term of this patent is extended or adjusted under 35 U.S.C. 154(b) by 71 days.

(21) Appl. No.: 16/177,015

(22) Filed: Oct. 31, 2018

(65) Prior Publication Data

US 2019/0130468 A1     May 2, 2019

Related U.S. Application Data

(60) Provisional application No. 62/671,918, filed on May 15, 2018, provisional application No. 62/661,367, (Continued)

(51) Int. Cl.
*G06Q 30/00* (2012.01)
*G06Q 30/06* (2012.01)
(Continued)

(52) U.S. Cl.
CPC ... *G06Q 30/0625* (2013.01); *G06F 16/90332* (2019.01); *G06F 16/951* (2019.01); *G06Q 30/0281* (2013.01)

(58) Field of Classification Search
CPC .............. G06Q 30/0625; G06Q 30/0281
(Continued)

(56) References Cited

U.S. PATENT DOCUMENTS 8,160,929 B1 * 4/2012 Park .................. G06Q 30/0601
                                                                     705/26.1
2004/0117189 A1   6/2004   Bennett
(Continued)

FOREIGN PATENT DOCUMENTS

WO      2014127500 A1    8/2014

OTHER PUBLICATIONS

Liu, Y. (2009). A process-based search engine (Order No. 3360489). Available from ProQuest Dissertations & Theses Global. (304916296). Retrieved from https://www.proquest.com/dissertations-theses/process-based-search-engine/docview/304916296/se-2 (Year: 2009).*
(Continued)

*Primary Examiner* — Michelle T Kringen
*Assistant Examiner* — Arielle E Weiner
(74) *Attorney, Agent, or Firm* — Lowenstein Sandler LLP

(57) ABSTRACT

Embodiments of the disclosure provide for a knowledge search engine platform to analyze a search query initiated by a user device to identify a natural language inquiry associated with questions about a particular business, (e.g., product brand data such as products, services, employees, events, etc.). This may include searching through large amounts of data for hidden patterns and relationships of events, and presenting this knowledge data in a readily understandable format for users. The knowledge data is then presented in a structured form that is easily digestible to allow users via the user device to find the information they are looking to retrieve. The knowledge data may also include competitor intelligence that allows users to identify competitors, by searching a local pack to return results of potential com-
(Continued)

petitors. The local pack may be within proximity of an indication of location of where the user is searching using with user device.

20 Claims, 14 Drawing Sheets

Related U.S. Application Data filed on Apr. 23, 2018, provisional application No. 62/579,748, filed on Oct. 31, 2017.

(51) Int. Cl.
*G06Q 30/02* (2012.01)
*G06F 16/951* (2019.01)
*G06F 16/9032* (2019.01)

(58) Field of Classification Search
USPC .................................................... 705/26.62
See application file for complete search history.

(56) References Cited

U.S. PATENT DOCUMENTS

| | | | |
|---|---|---|---|
| 2008/0059153 A1 | 3/2008 | Bennett | |
| 2008/0059455 A1* | 3/2008 | Canoy | G06F 16/9535 |
| 2012/0252497 A1* | 10/2012 | Altscher | H04W 4/02 |
| | | | 455/456.3 |
| 2013/0282486 A1* | 10/2013 | Rahle | G06Q 30/0625 |
| | | | 705/14.53 |
| 2013/0282757 A1* | 10/2013 | Ehsani | G06F 16/2471 |
| | | | 707/770 |
| 2014/0129591 A1* | 5/2014 | Lerman | G06F 16/2471 |
| | | | 707/770 |
| 2014/0279078 A1 | 9/2014 | Nukala et al. | |
| 2015/0170086 A1 | 6/2015 | Byron et al. | |
| 2015/0379554 A1* | 12/2015 | Copeland | G06Q 30/0239 |
| | | | 705/14.39 |
| 2017/0134335 A1* | 5/2017 | Goldstein | H04L 51/046 |
| 2018/0182013 A1* | 6/2018 | Haubold | G06Q 30/0641 |
| 2018/0349474 A1* | 12/2018 | Smith | G06Q 10/06 |

OTHER PUBLICATIONS

International Search Report for PCT Application No. PCT/US2018/58518 dated Jan. 17, 2019, 12 pages.
International Search Report for PCT Patent Application No. PCT/US2018/058518 dated Jan. 17, 2019, 12 pages.
Supplementary European Search Report for EP Application No. EP18872455 dated Jul. 13, 2020, 3 pages.

* cited by examiner

School of Rock Huntington - Locations
locations.schoolofrock.com › US › NY › Huntington ▾
Learn to shred on your favorite instrument at School of Rock Huntington! 1st Lesson is ... Instructor name
Parent of 2 students School of Rock Rockville Centre.

Wed, May 24  SOR HUNTINGTON free Adult Program Trial Lesson
Sat, May 27   SOR Huntington sponsors the stage at the YMCA Carnival ...
Mon, May 29   Closed for Memorial Day

250A

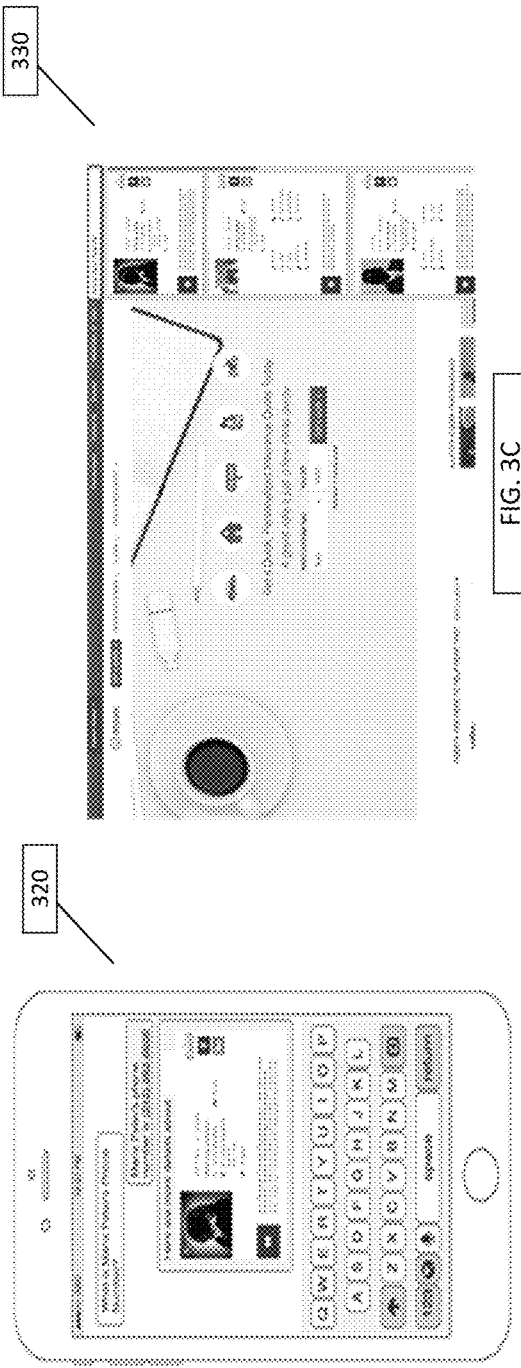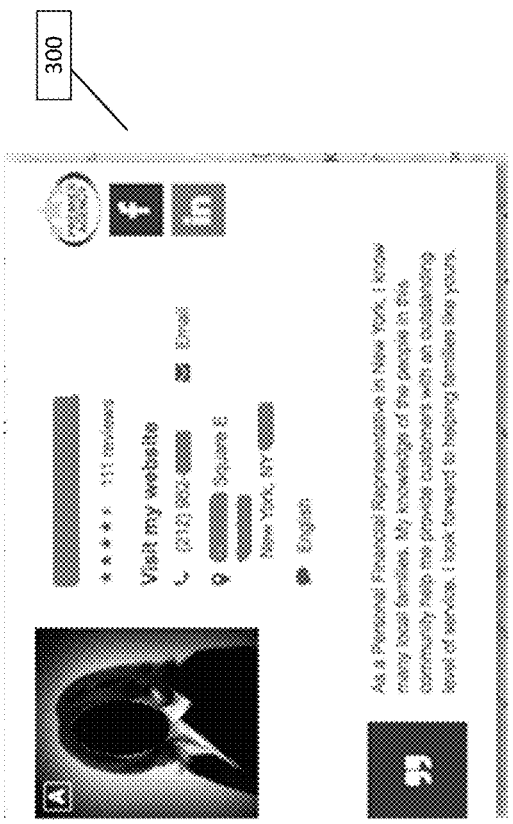
FIG. 3A
FIG. 3B
FIG. 3C

METHOD, SYSTEM, AND NON-TRANSITORY COMPUTER READABLE MEDIUM FOR ENHANCED BUSINESS LISTINGS

CROSS REFERENCE TO RELATED APPLICATIONS

This application claims the benefit of U.S. Provisional Application No. 62/579,748, filed Oct. 31, 2017, U.S. Provisional Application No. 62/661,367, filed Apr. 23, 2018 and U.S. Provisional Application No. 62/671,918, filed May 15, 2018, the entire disclosures of which are incorporated herein by this reference.

TECHNICAL FIELD

The disclosure relates generally to natural language processing, search engines and knowledge discovery, and more particularly, to a knowledge search engine platform for enhanced business listings.

BACKGROUND

Historically, an enormous amount of time, money, and effort has been expended by businesses and individuals in order to advertise and sell their products and services. For generations, various media have been used to realize such business matters. The pervasive nature of open networks, such as the Internet, has provided a global means to attract new customers and retain old customers. The customers may use a search engine in order to obtain such information as available on the Internet. Search engines are software programs that search databases, and then collect/display information related to search terms specified by a user. Many search engines have limited search functionality and are designed to help find information stored in a computer system, inside a corporate or proprietary network, or on the Internet.

BRIEF DESCRIPTION OF THE DRAWINGS

The disclosure is illustrated by way of example, and not by way of limitation, and can be more fully understood with reference to the following detailed description when considered in connection with the figures as described below.

FIG. 2B illustrates an example of an interface to operate in conjunction with the knowledge search engine platform of FIG. 2A in accordance with one or more aspects of the disclosure.

FIG. 2C illustrates an example publication of an event page listing in accordance with one or more aspects of the disclosure.

FIGS. 3A-3C illustrate examples of structured knowledge data in accordance with one or more aspects of the disclosure.

DETAILED DESCRIPTION

To find relevant data with respect to a query received from an end user (e.g., a user initiating a search via a web interface), many search engines use a keyword search based on text data provided by the end user. In conducting the search, the end user seeks to identify a web element (e.g., a webpage) that is responsive to the query that is copied and indexed by a search engine based on the keywords in the search query input. If any of the keywords are incorrect (e.g., incomplete, include a typographical error, misspelled, etc.) or not indexed by the search engine, the information the user seeks may not be identified or discovered in response to the query. If the combination of keywords in the search query matches a large number of webpages and information about those webpages (e.g., links) may be listed on several search result webpages. This may require the user to manually click on multiple links and sort through hundreds or thousands of similar pages before finding, if at all, the desired information. In other situations, the requested information responsive to the user query may not be found due to a gap (e.g., a lack of content) between the keywords on the user's query and the online data associated with the business. As such, the amount of information and misinformation that the user must negotiate to find a particular product or service is a time consuming process that often results in the user abandoning the search before obtaining the desired information.

Embodiments of the disclosure address the above-mentioned problems and other deficiencies with current search engine technologies by providing a knowledge search engine platform to allow websites, including, but not limited to, websites related to businesses, to enhance the user experience in their quest for online knowledge regarding, for example, a particular business's products, services, events and other type of brand data. Knowledge can be defined as "facts" or data regarding a subject that can be stored in a database and later queried. In some embodiments, the knowledge search engine platform includes a natural language processor to process search query hints and auto completion techniques to intuitively guide the user toward a helpful response. This processing is conducted by the knowledge search engine platform based on information about certain data associated with the business product data. Using the knowledge search engine according to embodiments of the present disclosure, business users (i.e., a user operating on behalf of a business entity) can centralize all of the structured public data about their company, and surface that data directly on their internal websites and third party websites. This same information via the knowledge search engine platform and some third-party APIs can also be, syndicated to hundreds of data publishers, such as Google™, Facebook™, Bing™, Apple™, and other search service providers.

Figure 1A:
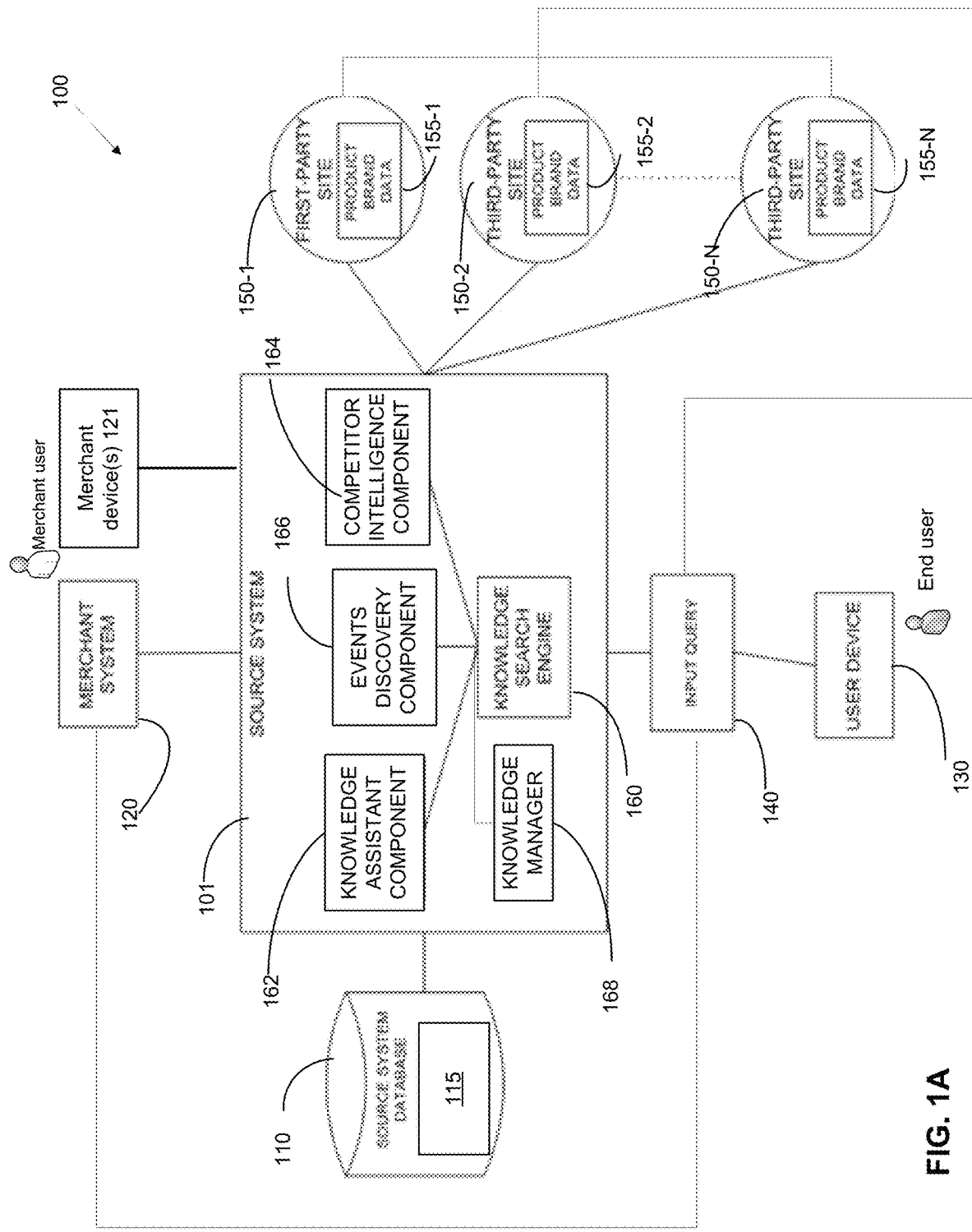
FIG. 1A illustrates an example of a high-level architecture of a knowledge search engine platform for enhanced business listings in accordance with one or more aspects of the disclosure.

FIG. 1A illustrates an example system architecture 100 implementing a knowledge search engine platform according to embodiments of the present disclosure. In one embodiment, the knowledge search engine platform enables a user operating a communicatively connected merchant system 120 (herein referred to as a "merchant user") to enhance one or more business listings associated with the merchant in accordance with one or more aspects of the disclosure. In some embodiments, the architecture includes a central computer (hereinafter "the source system 101") that may include a plurality of software modules, such as a knowledge search engine 160, that is coupled to a source system database 110. In one embodiment, the software modules may be executed on one or more computer platforms of the source system that are interconnected by one or more networks, which may include the Internet. The software modules may be, for example, a hardware component, circuitry, dedicated logic, programmable logic, microcode, etc., that may be implemented in a processing device (not shown) of the source system 101.

In some embodiments, the source system 101 may generate enhanced business listings for provisioning to an end user in response to a search query initiated via a search engine provided by one of multiple search service providers, according to embodiments of the disclosure. As used herein, the term "end user" refers to one or more users operating an electronic device (e.g., user device 130) to submit a search or input query 140 associated with a merchant for processing by the source system 101. For example, the end user may be a customer or prospective customer searching for information about one or more merchants. The source system 101 may be communicatively connected to a user device 130, and operates to respond to a search query 140 initiated by an end user via the user device 130. For example, the user device 130 may be associated with an end user that may be a customer of a merchant seeking information about the merchant or a related product/service. The end user may be searching for information on a merchant site (for example, first party site 150-1, which is further described below). In some embodiments, the source system 101 may be communicatively coupled to a merchant system 120.

In one embodiment, the merchant system 120 may include one or more components of the source system 101. In this embodiment, the merchant system 120 and the source system 120 may be integrated such that the merchant system 120 employs the source system 101 and its related functionality to respond to one or more input queries 140 received from a communicatively connected user device 130. According to embodiments of the present disclosure, as shown in FIG. 1A, the user device 130 may submit an input query 140 to the merchant system 120 (wherein the merchant system 120 is integrated with the source system 101) and/or submit an input query 140 associated with the merchant system 120 to the source system 101. In other embodiments, the user device 130 may submit an input query to first-party site 150-1 (which may be the merchant's website) and/or third-party sites 150-2-150-N, which are communicatively coupled to source system 101.

The merchant, via the merchant system 120, may use the source system 101 to manage its data on the source system 101 and push that data to the customer based on the search/input query 140. In that regard, the merchant controls all the data that is being returned to the end user from the source system 101. In other embodiments, the information may be pulled from other system(s), such as a website associated with the merchants or other type of search websites. In one embodiment, the merchant user uses the merchant system 120 to communicate with the knowledge assistant component 162 of the source system 101 to request changes to data associated with the merchant system 120 (e.g., data that may be provided to an end user in response to an associated input query 140). In other embodiments the merchant user may use separate user devices (e.g., merchant devices 121) to communicate with the knowledge assistant component 162. The user device may include, but is not limited to, a mobile phone, a tablet, or other electronic devices. The data sent via the user device may automatically be added source system database 115 and automatically be pushed to first-party site 150-1 and third-party sites 150-2 to 150-N without the need to log into merchant system 120 or source system 101 and added the information via knowledge manager 168.

In some embodiments, the source system 101 may also be communicatively connected to a plurality of first-party website(s) 150-1 and third-party sites 150-2 through 150-N comprising product brand data, 155-1, 155-2 through 155-N for one or more business. Each of the first-party site(s) 150-1 and third party sites 155-2 through 155-N provides a plurality of modules (e.g., APIs) with which the source system 101 interacts for carrying out operations and providing relevant data to the user device(s) 130. For example, each of the sites 150-1 through 150-N may include APIs to access one or more prescribed databases dedicated to storing information (e.g., product brand data 155-1 through 155-N) regarding the products, services, employees, events, etc. of a particular business. In another embodiment, a merchant user uses the knowledge search system 101 to manage all of its information via a knowledge manager 168. For example, the knowledge search system database 101 may include one or more prescribed databases 115 dedicated to storing the information related to the product brand data 155-1 through 155-N. In some embodiments, the data or information associated with a merchant system may be added, edited, updated, changed, deleted, etc. and the data may be matched and set (e.g., locked) in a corresponding listing according to suitable techniques, such as those described in greater detail in U.S. Pat. No. 8,819,062, which is incorporated herein by reference in its entirety.

As shown in FIG. 1A, the system architecture 100 may include a source system 101 including a plurality of software modules executed on one or more computer platforms that are interconnected by one or more networks, which may include any suitable network, such as the Internet. In some embodiments, the software modules may include one or more hardware components, circuitry, dedicated logic, programmable logic, microcode, etc., and one or more sets of instructions executable by one or more processing devices of the source system 101. These software modules may include, for example, (1) a knowledge search engine 160 to provide enhanced website searches by analyzing a search query initiated by a user device 130 to identify a natural language inquiry associated with questions about a particular business, (e.g., product brand data such as products, services, employees, events, etc.), (2) a knowledge assistant component 162 that allow merchant users and end users to communicate with the source system 101 across various specialized technologies based on, in some embodiments, such factors, as distance, prominence, traffic, cultural relevance, industry relevance, event type relevance, directory vs. editorial sites, paid vs. free, long-term vs. last-minute planning, etc., (3) an events discovery component 166 that provides an event discoverability platform to allow users associated with the merchant system 120 (e.g., merchant users, event marketers, public relation professionals, advertisers, event planners, etc.) to ensure events relating to a merchant system 120 can be identified via an online search in response to an input query 140 (such input query 140 may be entered into first-party site 150-1 and/or third-party sites 150-2 to N, including, but not limited to Google™, Facebook™, Eventbrite™, etc.) submitted by end users (e.g., prospective attendees), and (4) a competitor intelligence component 164 that allows a merchant user to select one or more competitor entities and identify related competitors for competitive analysis by the source system 101 (e.g., a comparison of an average rating of a local competitor identified by the merchant user to another local competitor or the merchant user's own business). In one embodiment, the competitor intelligence component 164 may provide a merchant user with information to identify one or more competitors that the merchant user may not have previously been aware of through the use of "local pack" searching and analysis. In an embodiment, a local pack includes information about local merchants responsive to an input query 140 submitted by a merchant user or an end user, wherein "local" competitors are identified based at least in part on a geographic location identified with respect to the system initiating the input query (e.g., the merchant system 120 or the user device 130) or other geographic information associated with the merchant or end user (e.g., geographic information stored by the system and associated with the merchant or end user).

The knowledge assistant component 162 is a communications platform that allows merchant systems 120 (e.g., merchant users) to interact with the source system 101 to perform various operations, such as, for example, provisioning or updating content associated with the merchant (e.g., identifying the merchant's holiday hours, updated menu information, regular business hours, contact information, etc.), receiving requests to change profile content (e.g., add a photo to the photo gallery), or notifying merchant users of publisher data suggestions and allowing merchant users to accept or reject the suggestions (e.g., a proposed change to the merchant information). In some embodiments the merchant users may use a dialog interface on a merchant device 121 (e.g., a mobile phone) to directly send updated information to source system database 115 and first-party site 150-1 and third-party sites 150-2 to 150-N. In some embodiments, the dialog interface may include, but is not limited to SMS, phone, and instant message. In some embodiments, the merchant user may interact with a dialog interface generated by an application installed on the merchant device 121 or a web service accessible via a web browser of the merchant device 121. In some embodiments, the data is automatically sent to the first-party site 150-1 and third-party sites 150-2 to 150-N. In other embodiments, the processing logic of the source system 101 updates the data in the source system database 115 and then automatically pushes the data to the first-party site 150-1 and third-party sites 150-2 to 150-N. In some embodiments, the data (e.g., updated data) provided by the merchant system may be matched to one or more listings or profiles associated with the merchant system (e.g., a listing maintained by the source system or one or more first party sites 150-1 or third party sites 150-2 to 150-N) to enable the locking or setting of the updated information in the one or more associated listings. For example, the data may be matched and set in a corresponding listing according to suitable techniques, such as those described in greater detail in U.S. Pat. No. 8,819,062, which is incorporated herein by reference in its entirety.

In an embodiment, an end user may use a user device 130 to submit a suggested or requested change or edit to a portion of the merchant information provisioned to the end user in response to an input query 140 (e.g., the end user may suggest a change to the operating hours of the merchant if the end user determines that the published hours are incorrect). In response, the knowledge assistant component 162 may review the proposed or suggested change and provide the change request to the merchant system. In one embodiment, the knowledge assistant component 162 may update information associated with a merchant and provide a notification of the update or change to the merchant system 120. In another embodiment, the knowledge assistant component 162 may collect updated information associated with the merchant and provide the updated information to the merchant system 120 (or directly to a merchant user who is authorized to approve the updated information via a user device) for review and approval prior to adoption of the update or change.

In some embodiments, the knowledge assistant component 162 enables merchant users to opt-in to this feature of the source system 101 by entity and/or by interaction type. In some embodiments, the merchant users add a phone number/account information for each interaction type on the entity (without associating to user). In some embodiments interaction types may depend on whether the merchant user is initiating the interaction with knowledge assistant component 162 or the knowledge assistant component 162 is initiating the interaction with one or more particular merchant users. Specific interaction types may include, but are not limited to, uploading a photo to source system 101, sending a change feature message, sending a change hours message, etc. In some embodiments, the knowledge assistant component 162 may auto-enable the merchant system for certain account types or businesses and use merchant matching API to collect social media-related information about the merchant user (e.g., an end user's Facebook™ identifier). This may be used if the dialogue interface is a chat function on a third-party site (e.g., Google™ hangouts, Facebook™ Messenger, etc.) to make it easier for merchant users to engage with knowledge assistant component 162 via third-party chat software. In some embodiments, the interactions with the merchant user may be initiated by the merchant user (e.g., merchant-initiated interactions) or may be initiated by the source system (e.g., system-initiated interactions). Some example interaction types includes, but are not limited to: uploading photo to gallery, changing a featured message, changing hours (e.g., either immediate or scheduled and either regular or holiday), requesting analytics information, requesting reviews information, providing geographic coordinates associated with a location/entity; updating menu items, adding a calendar event, creating a social media post, indicating Holiday hours, reviewing a response, performing data confirmation (e.g., store hours, phone number information, website information, etc.), capturing photo content, provisioning a publisher data suggestion, linking to an analytics dashboard, providing an unavailable listing notification, posting and/or responding to a new review, suppressing duplicate data, performing competitive intelligence analysis, etc.

In an embodiment, in response to the knowledge assistant component 162 registering a location with a merchant with and confirming that the merchant user has a validated phone or social media account linked (depending on the interaction type), the source system 101 may engage with the merchant user on the associated social network platform. As a result, merchant user can update information via a user device by communicating with knowledge assistant component 162.

According to embodiments of the present disclosure, the knowledge assistant component 162 executes searches based on input from the merchant user (e.g., input queries submitted via merchant system 120). In one embodiment, the search may be conducted based on information inputted by the merchant user (e.g., their zip code, geolocation or other information that could lead to the determination of the merchant user's location and/or location of interest). In another embodiment the search may be based on where the merchant system 120 is searching from (for example, the merchant system's IP address is queried and used in connection with the search). The knowledge assistant component 162 may assess the search results to provide recommendations to the merchant user. In one embodiment, the recommendation may be presented to the merchant user as a notification in the knowledge assistant component 162.

In another embodiment, the knowledge assistant component 162 provides one or more recommendations to a merchant system 120 to improve the content of search results relating to the merchant, as described in detail herein. For example, a search of competitor information published in indexed search engine databases may be performed by the competitor intelligence component 164. The competitor intelligence component 164 (as further described above and below) may determine that a competitor of a merchant published several images associated with the competitor's store in an applicable location. In an embodiment, the competitor intelligence component 164, which is communicatively coupled to the knowledge assistant component 162, may send the information to the knowledge assistant component 162 and the knowledge assistant component 162 may send a message (e.g., a text, electronic mail, etc.) to the merchant system 120 (and/or a user device of a particular merchant) recommending that the merchant add photos to a listing associated with the applicable business location that is near the competitor's place of business. Upon input from the merchant system 120, the knowledge assistant component 162 may upload photos to the websites 150-1 through N associated with the merchant and/or source system database 115.

In another embodiment, the search results may show that certain competitors have messages associated with their respective business locations (e.g., coupon codes, information about sales, etc.) and such messages are identified as impacting a decision to place the competitor in an associated local pack listing. In this regard, the knowledge assistant component 162 may recommend that the merchant system 120 add a similar message to their published merchant information and process input associated with the recommended message received from the merchant system 120. An example method performed by the knowledge assistant component 162 is described below with respect to FIG. 8.

In some embodiments, the input query 140 may be related to an event associated with a business. In such cases, the knowledge search engine 160 after analyzing the user's query may return event results pursuant to the events discovery component 166 that would appear for relevant zip code/location queries, as well as any query directly asking for events. In this example, if there is only one upcoming event near the user, the knowledge search engine 160 also provides information about nearby branches and advisors of the business that is associated with the event. For example, the knowledge search engine 160 may provide public information about the merchant's brand product data, such as executive bios and information about the merchant's board of directors, and various products and services offered by the merchant. In some embodiments, the knowledge search engine 160 surfaces and syndicates job postings for the merchant system 120 via a response to a knowledge search query on one or more websites 150-1 through N. In some embodiments the job postings may be returned as results to an end user who made an input query 140 via user device 130.

The events discovery component 166 is a component of the source system 101 that allows promotor users (e.g., event marketers, PR professionals, social media influencers, etc.) to publish information concerning upcoming events and promotions in a manner that the information is discoverable by an end user (e.g., as a response to a related input query submitted by the end user) on a first-party site 150-1 and/or third-party sites 150-2 to 150-N. This is accomplished by, building branded, schema marked-up event pages, creating event listings on a network of relevant event publishers (for example a subset of third-party sites 150-2 to 150-N), and by reporting event engagement analytics. The events discovery component 166 allows a merchant and related promotor users control published facts about the merchant, including, but not limited to, the merchant's locations, people, companies, and events for distribution via the source system 101. In an embodiment, listings and pages associated with a first entity of the merchant may be linked to listings and pages of other entities of the merchant. For example, event pages can link to location pages, and people listings can include information about related events. Using the events discovery component 166, merchants can employ content approvals and assets via a robust developer API with ready-made integrations with popular event management tools like Eventbrite™ and SplashThat™.

In some embodiments, the event discovery component 166 is configured to enable a merchant user to manage event data in the knowledge manager 168. For example, event data may be synchronized to associated services for the publication of information relating to the events. In some embodiments, the event discovery component 166 creates or generates event pages and schema-marked up for a third party search engine (e.g., a third-party site 150-N). In some embodiments, the event discovery component 166 is configured to accept files from a merchant user or event promotor which provides event information. For example, a comma-separated values (CSV) file may be uploaded to knowledge manager 168 from a spreadsheet which identifies one or more events and added to source system database 115.

In some embodiments, the event discovery component 166 generates event listing for publication via third-party event directories discoverable by search engines. The event discovery component 166 may further be configured to generate analytics (e.g., ROI statistics such as an amount of sales generated vs the overall cost of the event) associated with events for review and consumption by an event marketer or promotor.

In some embodiments, the event discovery component 166 generates, hosts, and manages event pages on behalf of a merchant user. The event pages are discoverable through an end user search using a third-part y search engine (e.g., through Google™ Search results, Google Maps™, which may be a third-party site). In some embodiments, the event discovery component 166 provides a platform for the management of event pages, an event locator/finder, and event directory pages. The standalone or dedicated event page may be published on behalf of a merchant user and include a unique page (e.g., a specific URL) for each event.

FIG. 2C illustrates an example publication of an event page listing 250. In this example, the event page listing 250 includes event information 250A in accordance with multiple events associated with a merchant location. According to embodiments of the present disclosure, the event discovery component 166 may generate a standalone event page associated with each of the respective links in the event listing 250A. In this example, an end user conducting a search may click through directly to a dedicated event page that describes the "SOR HUNTINGTON free Adult Program Trial Lesson". The URL might look something like this: locations.schoolofrock.com/huntington/2017-05-24-free-trial-lesson.html.

In some embodiments, an event page may be generated for each entity location associated with a merchant and provide an additional level in a directory hierarchy that lists upcoming events for the particular location. In some embodiments, each event listed on an "upcoming events" page may be linked to a dedicated event page.

In some embodiments, a merchant user may use the event discovery component 166 and knowledge manager (e.g., knowledge manager 168 of FIG. 1A or knowledge manager 257 of FIG. 2A) to manage events as a "first class entity" wherein, instead of managing events as an attribute of a location, events are managed at the account level. For example, the knowledge manager 257 may publish a URL associated with an event represented by the following example URL: events.schoolofrock.com/huntington/free-trial-lesson.html.

In this regard, publishing events as a first class entity allows for richer event pages by enabling merchant users to define custom fields for events. Example custom fields that may be used to define event attributes such as a call-to-action to register, contact Information, photo galleries. etc. In some embodiments, publishing events as a first-class entity allows the knowledge manager to build out an "Events Finder," (similar to a store locator) that would allow end users (e.g. consumers) to find events by date and/or by location.

In some embodiment, the events discovery component 162 provides functionality to merchant users to create events via an event management tool, and have that information be synchronized to the source system and communicated (e.g., pushed) to a network of service publishers. In some embodiments, analytics may be sent back to the event management tool to enable a merchant user to view all event analytics in centralized interface. In other embodiments, the events discovery component 162 may append booking links into pages of the merchant which can also be pushed out to the service publishers.

The events discovery component 166 supplements a merchant's event management tool with branded, schema marked-up event pages, and event listings across a network of event publishers. Additionally, the events discovery component 166 for events includes analytics to help the customers measure the performance or engagement associated with the events in terms of impressions, clicks, RSVPs, and ticket sales. Example types of support events are provided in Table 1 below:

TABLE 1

| Category | Example Types of Events |
| --- | --- |
| Music | Concerts |
| | Festivals |
| | Band tours |
| | Workshops/Classes/Lessons |
| Entertainment | Award Shows |
| | Plays/Musicals |
| | Meet & Greet |
| | Sporting Events |
| Real Estate | Open Houses |
| | Conferences |
| Food & Dining | Sampling Events |
| | Restaurant Grand Openings |
| Automotive & Vehicle | Promotions - e.g., Auto Nation Memorial Day Event |
| | Test drives - e.g., Tesla Experience Model X event |
| Business Services | Job fairs |
| | Conferences |
| | Fundraisers |
| Health & Medicine | Blood drives |
| | Flu shots |
| Retail & Other | Product launches - e.g., Sneaker launch |
| | Promotions |
| | Grand Openings |
| | VIP Events |
| | Trade Shows/Conferences |
| | Workshops/Classes (one-time) |
| | Workshops/Classes (recurring) |
| | Book Signings |
| Culture | Indian |
| | Christian |
| | Jewish |
| | Islam |
| | French |
| | German |

Examples of associated field names, field types, and field descriptions are provided in Table 2 below:

TABLE 2

| Field Name | Field Type | Field Description |
| --- | --- | --- |
| Name | Single-line text | Name of event |
| Categories | Multi-option select (from preset Category list) | Category of event |
| Address (with subfield for Venue Name) | Single-line text | Address of the event. Includes a subfield for Venue Name |

TABLE 2-continued

| Field Name | Field Type | Field Description |
| --- | --- | --- |
| Start Date/Time, End Date/Time, Duration | Date/Time | Time of event. End date/time/duration is optional |
| Description | Multi-line text | Description of event |
| Performers | Text List | List of people who will perform at the event. Refers to performers. For awards, it's the nominees. For music festivals, it's the lineup. For film festivals, it's the participating films. Etc. |
| Age Range | Numeric | Age range for the event. A good place to indicate if there is a minimum required age - e.g. (21, No Maximum) |
| Event URL | URL | Link to a webpage for the event |
| Cover Photo | Photo | Logo or main photo for the event. |
| Gallery | Photos | Any additional photos of the event that should be showcased |
| YouTube Video | URL | Any related YouTube videos |
| Ticket Information | Multi-line text | Description of any ticket-related information including how to obtain tickets - e.g. "Buy a ticket in advance online. Tickets will also be available for purchase at the door!" |
| Price range | Low-High | Extremes of ticket prices. |
| Ticket URL | URL | URL for purchasing tickets |
| Ticketed? | Yes/No | Is this event ticketed? |
| On sale date | Date/Time | If the event is ticketed, when tickets go on sale |
| Attributes | List of items | Subset of attributes: Family friendly For kids For teens Seniors Accesible 18 and over 21 and over All ages Invitation only RSVP required Budget Date night |
| Keywords | Text List | Any keywords related to the event |
| Status | Single Option Select | Status of event. Options are scheduled, rescheduled, postponed or cancelled. The default value will be scheduled. |
| RSVPs | List | List of RSVPs |
| RSVPs.name | Name | RSVP Name |
| RSVPs.email | Email | RSVP Email address |
| RSVPs.quantity | Natural number | Number of people expected to attend |
| RSVPs.timestamp | Timestamp | When the RSVP was entered |

In an embodiment, the events discovery component 166 allows merchant users to create events in an event management tool, and have the event information synchronized to the source system 101 and sent out to a network including one or more service publishers. In some embodiments, analytics may be aggregated and presented via an event management tool, to allow the merchant user to view event analytics in single interface. In other embodiments, the events discovery component 166 may append booking links into pages of the merchant system, which may also be sent out to the service publishers.

The competitor intelligence component 164 allows merchant users to identify competitors that the merchant was not previously aware of by searching a local pack (e.g., a list of merchants corresponding to a search such as "food near me"). In some embodiments, the searches may be preprogrammed by the competitor intelligence component 164, and the competitor intelligence component 164 may automatically carry out such searches of the local pack. In other embodiments, merchant users may choose or create inquiries via source system 101 based on information it wants returned. For example if merchant users want to learn the closest restaurants that sell burgers, they can input that information and the search can be based on that. The local pack may identify one or more merchant competitors within a predetermined proximity of a merchant user, or a location of the merchant itself. In some embodiments a merchant user may use knowledge manager to manage one or more locations associated with the merchant. Competitor intelligence component 164 may use the location information associated with a particular location that is stored in source system database 115 when carrying out the search of the local pack to determine the competitors nearest to that location. In other embodiments, the search results of the local pack may be aggregated across all locations, or all locations in a particular region. In one embodiment, the search may be based on the location of the merchant managing the information (e.g., IP address associated with the user device of the merchant or based on a location entered by a merchant). The local competitors may further be identified using one or more Internet searches outside of the local pack. For example, competitor intelligence component 164 may search one or more suitable categories of the business (e.g., restaurant, repair shop, pet store) in addition to location information, and the competitor intelligence component 164 may identify local competitors by searching one or more data stores using the category and a local area identifier, such as a city name or zip code, as search terms. The competitor intelligence component 164 may identify the local competitors from the search results of one or more of the searched data stores, which may include Internet search engines, business listing services, etc. After competitor intelligence component 164 searches the local pack (and potentially other sources of information) the businesses may then be ranked based on certain factors (e.g., a frequency or number of local pack matches) and shown to merchant users via knowledge manager 168 based on such ranking. In some embodiments the frequency is the frequency in which the competitors appear in the local pack (e.g., the number of local pack matches for each competitor). Based on competitors that are identified, recommendations can be provided via the knowledge assistant component 162 to the merchant system 120 (e.g., a recommendation indicating—competitor x has photos on their website, therefore the merchant system 120 may consider adding additional photos) and have a merchant system 120 act on those recommendations.

In one embodiment, the "local pack" is a section of a search provider (e.g., Google®) search results that show locations of one or more merchants in an identified geographic area that result from an input query 140 initiated by an end user into a third-party site (e.g., one or more search terms entered via the search provider's website and/or information identifying a location of the end user). The "local pack" may include, but is not limited to, a map that shows the location of one or more merchants and a list of such locations with relevant information (e.g., name of merchant, address of merchant, distance from a location identified with the end user, business hours, etc.). The local pack results may include, for example, local pack competitors and/or local pack advertisements. The merchants identified in the local pack may be within a certain predetermined proximity of an indication of location of where the end user is located (e.g., based on an IP address of the end user's user device 130) or the location an end user entered in an input query 140 (e.g., find me pizza in Anytown, USA). The data for determining competitors may be obtained from searches of the local pack run for each merchant using the source system 101.

Figure 1B:
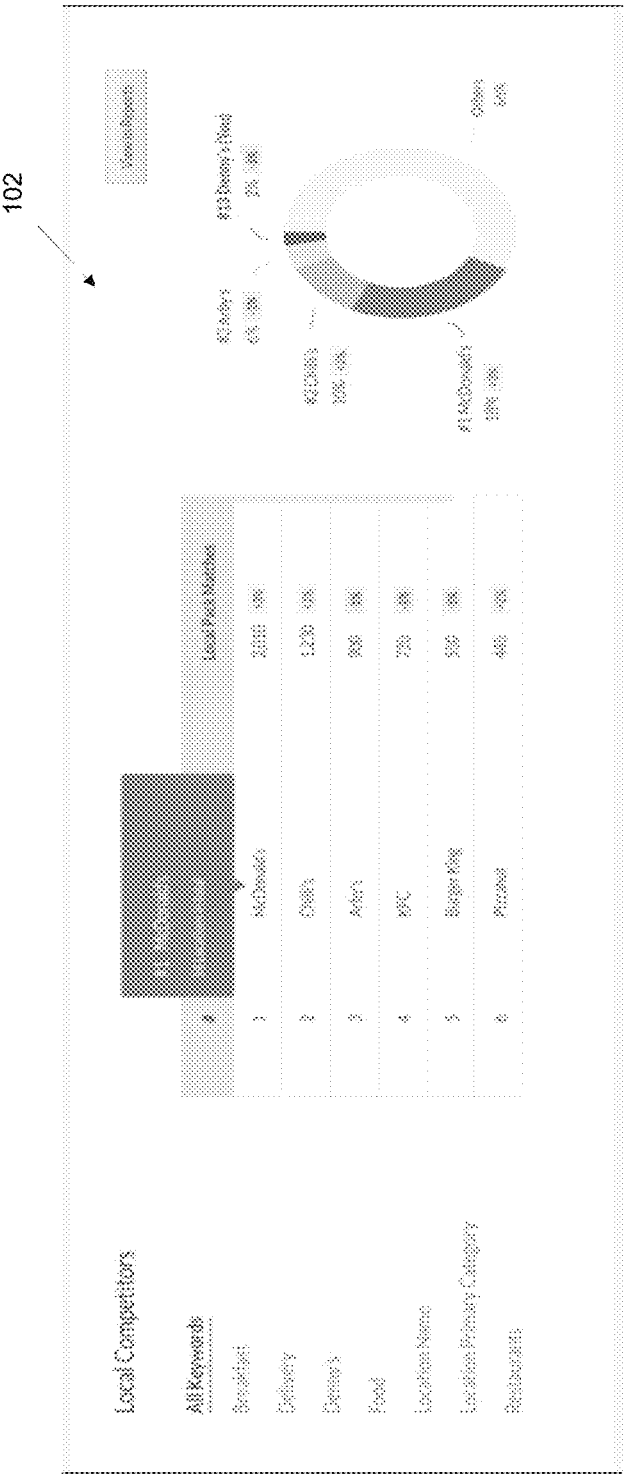
FIG. 1B illustrates an example of an interface to operate in conjunction with the knowledge search engine platform of FIG. 1A in accordance with one or more aspects of the disclosure.
Figure 1C:
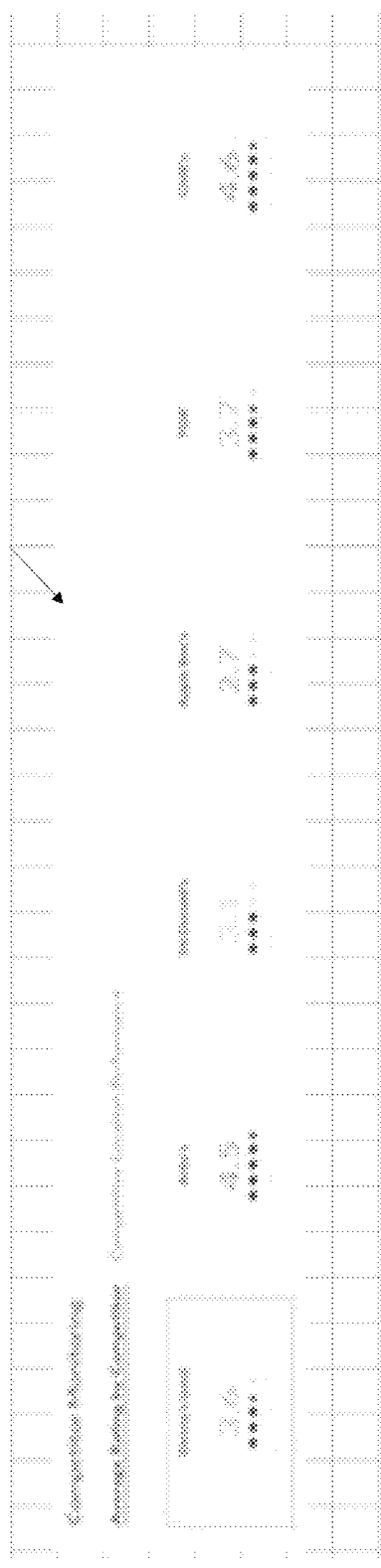
FIG. 1C illustrates an example of an interface to operate in conjunction with the knowledge search engine platform of FIG. 1A in accordance with one or more aspects of the disclosure.

In some embodiments, the competitor intelligence component 164 enables merchants to monitor and compare a rating associated with one or more local competitors (e.g., local competitors identified by the merchant or identified by the competitor intelligence component 164 on behalf of the merchant). FIG. 1B illustrates an example of an interface 102 of the source system 101 of FIG. 1A. The interface 102 may be used for managing and monitoring information associated with ratings corresponding to local competitors of a merchant. For example as shown in interface 102, a McDonald's™ location on West 3rd street in New York may execute a search and comparison to identify rating information associated with certain locations of local competitors (e.g., Burger King™ and Minetta Tavern™). Reviews competitor intelligence will have several main parts to fully operate, a data collection mechanism, a full set of reports in report builder and an analytics modules in the reviews overview screen. FIG. 1C illustrates an example of an interface 103 showing a local pack corresponding to a competitive analysis associated with a merchant system generated by the source system 101 of FIG. 1A.

In some embodiments, the competitor intelligence component 164 may contain information about new competitors. If multiple locations are selected, results may be shown keyed by "Title". In some embodiments, this may aggregate together all locations of a particular competitor. If a single location is selected, then competitors may be shown by both "Title" and "Address". As shown in FIG. 1B, the local pack dashboard may be implemented to display the above information, so that users can share the local pack competitors and perform various types of competitive use analytics. In some embodiments, to begin data collection, the merchant user may enter information associated with any number of competitors (e.g., 5 or more competitors) per location (as indicated by name and URL) in the competitor intelligence component 164. These competitors may be the same competitors that are discovered via the local pack search. In other embodiments, the competitors may be added via merchant users. For example, McDonald's™ may add Burger King™ as a competitor for all locations and a geographically proximate burger shop as another competitor. They set up the first competitor in bulk and then have local store manager choose the nearest burger shop. In this example, the store managers may choose Minetta Tavern™ and Five Guys™.

In some embodiments, the competitor intelligence component 164 finds the nearest location that matches the name and pulls in all (or as many as publically available), or a subset of reviews and average rating. The reviews may be pulled in when the merchant user requests the information, it may be pulled in on a periodic basis (e.g., monthly), or when the competitor intelligence component 164 automatically determines that reviews have been added or updated. In some embodiments, the competitor intelligence component 164 may determine that the nearest location is marked as closed. In such instance the competitor intelligence component 164 may pull in the data from the next nearest location or advise merchant user (via knowledge assistant component 162 or otherwise) to choose another location. In other embodiments, competitor intelligence component 164 may choose another location if the nearest location doesn't have enough reviews.

Figure 2A:
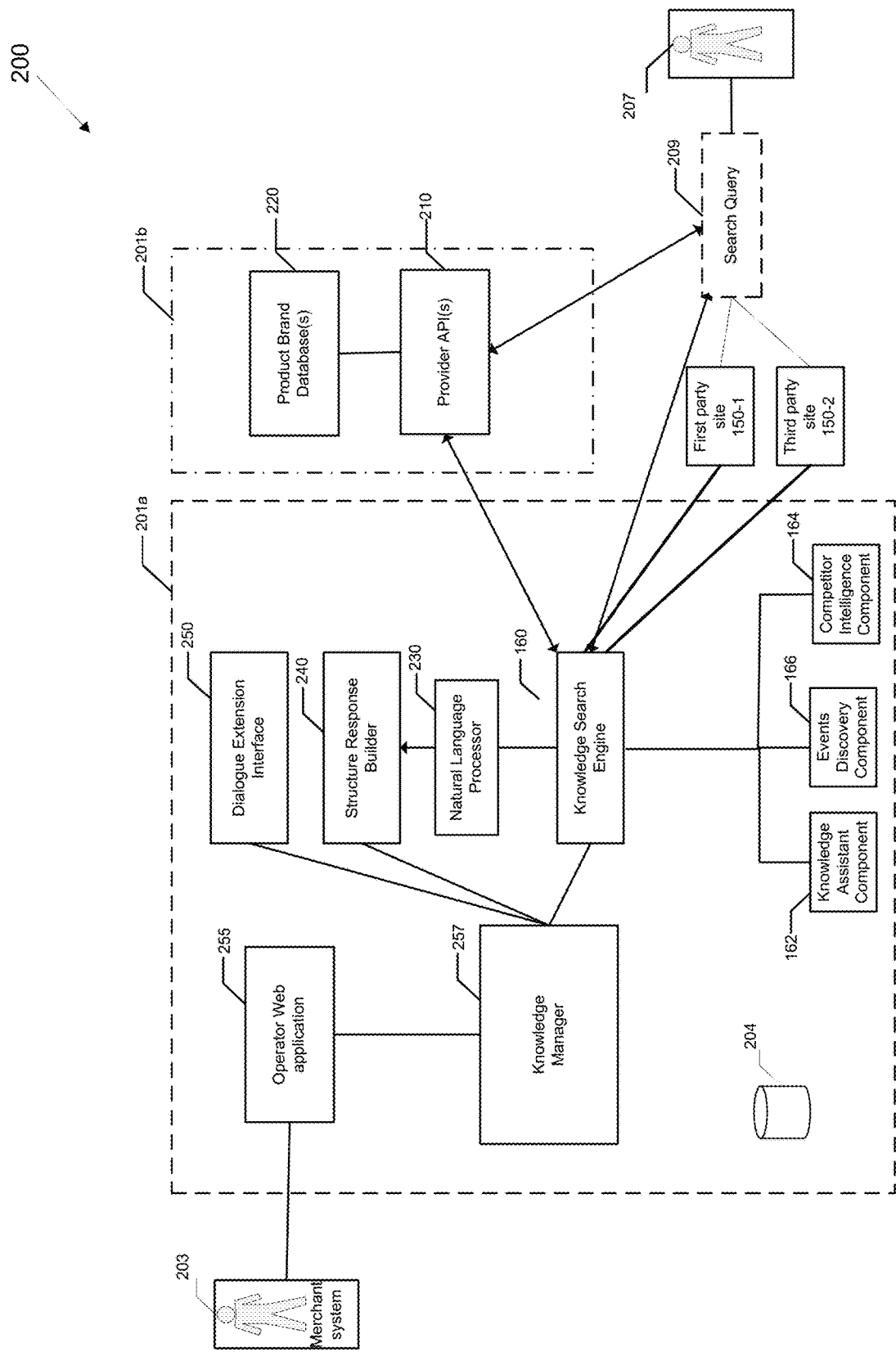
FIG. 2A illustrates an example of a system including memory to support a knowledge search engine platform for enhanced business listings in accordance with one or more aspects of the disclosure.

FIG. 2A illustrates an example of a system including a memory to store instructions associated with a knowledge search engine platform for enhanced business listings, in accordance with one or more aspects of the disclosure. In some embodiments, memory may be a system database (such as database 110 in FIG. 1A), or a storage system comprising the system database. The system may be executed on one or more computer platforms interconnected by one or more networks, which may include the Internet. In some embodiments, the system includes a central computer platform (hereinafter "the source system 201*a*") that includes system database 204 and a plurality of software modules that are communicatively connected with one or more merchant systems 203. In some embodiments, source system 201*a* may perform functionality described in connection with source system 101 of FIG. 1A. For example, source system 201*a* may include a knowledge search engine 160, a knowledge assistant component 162, an events discovery component 166, and a competitor intelligence component 164, as shown in FIGS. 1A and 2A.

Figure 2B:
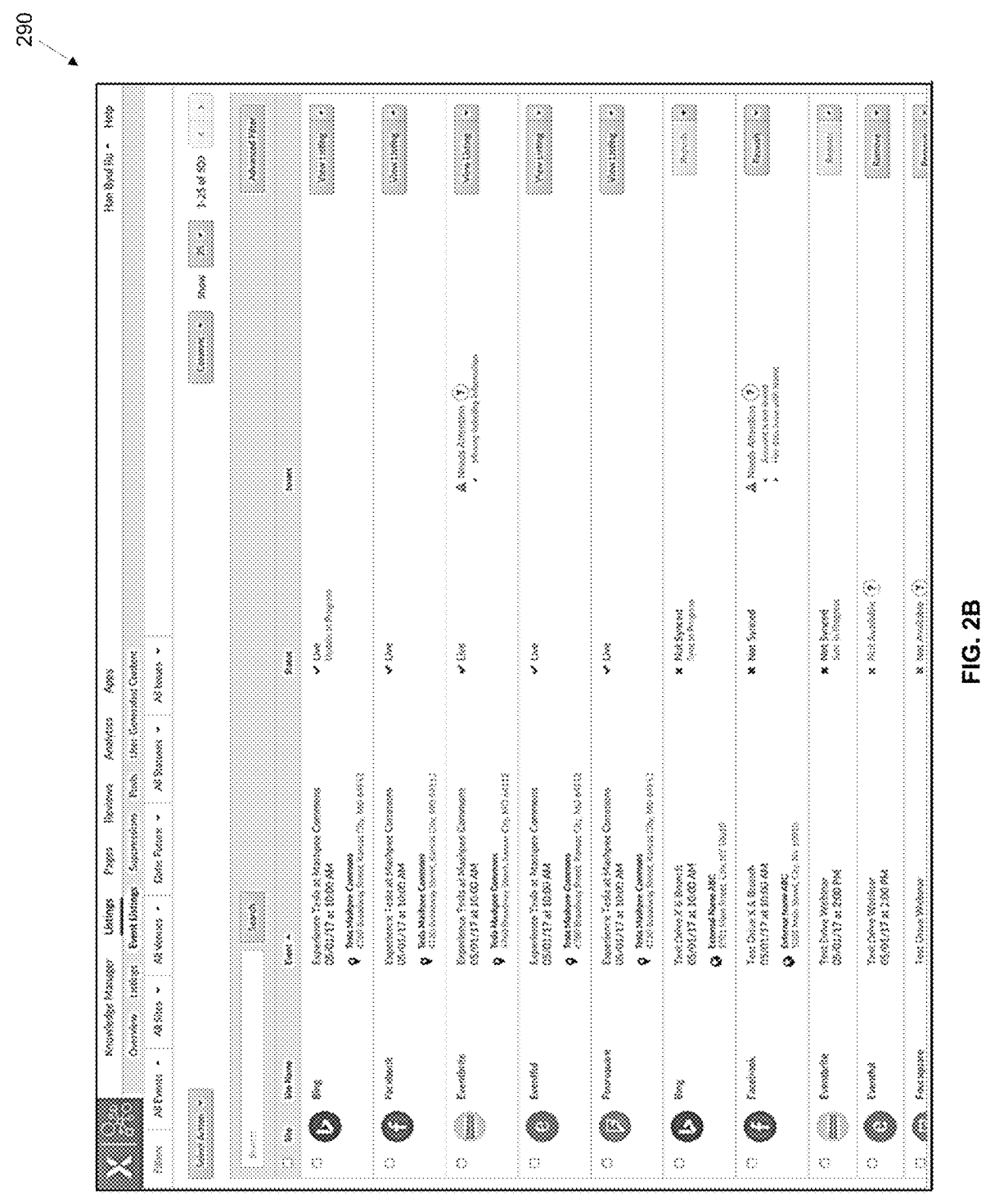

Source system 201*a* may be in communication with a plurality of service provider computer platforms (hereinafter "the service provider system(s) 201*b*"). The service provider system(s) 201*b* provide a plurality of modules (e.g., provider APIs 210) with which the source system 201*a* interacts for carrying out operations and providing relevant data to the user device(s). For example, provider APIs 210 may access one or more prescribed databases 220 dedicated to storing information (e.g., product brand data 155-1 through 155-N) regarding the products, services, employees, events, etc. of a particular business. In other embodiments, the source system database 204 may include all or a portion of the product data. In some embodiments, the source system database 204 may include one or more prescribed databases dedicated to storing the information related to the product brand databases 220. In another embodiment, a merchant 203 uses the source system 201a to manage all of its information. For example, the merchant 203 may be provided with an operator web application 255 to access a knowledge manager 257 for managing data within the source system 201a. In FIG. 2B, an example of an interface 290 for implementing the knowledge manager 257 of system 200 is shown.

In FIG. 2A, source system 201a is shown including a knowledge search engine 160. According to one or more embodiments of the present disclosure, the knowledge search engine 160 may be implemented to provide enhanced search results in response to end user input queries, for example input queries to first-party site 150-1 and/or one or more third-party sites 150-2 to 150-N. In addition, a merchant system may conduct a search and the knowledge search engine 160 may generate enhanced search results in response to the merchant system input query. The traditional search experience on a website results in a list of page URLs which may lead to an unpleasant user experience. The knowledge search engine 160 changes this by implementing, in some embodiments, several software modules that include, but not limited to, a natural language processor 230 that allow users to search in natural language or voice (e.g., the natural language process may parse the inquiry and turn it into a set of filters), a structured response builder 240 that can build structured answers to search queries to allow users to quickly take action, and a dialogue extension interface 250 that allows the knowledge search engine 160 to change from a traditional search box into a full conversation UI. In some embodiments, the knowledge search engine 160 can also use the dialogue extension interface 250 to ask for additional information from the users to help fill in any knowledge gaps regarding the business. In addition, the dialogue extension interface 250 may be used to allow users to add on follow up questions regarding any answers provided.

In some embodiments, the knowledge search engine 160 may analyze a search query 209 initiated by an end user via a user device 207 to identify a natural language inquiry associated with questions about a particular merchant, (e.g., product brand data 220 such as products, services, employees, events, etc.). In other embodiments, the search query 207 may relate to third parties or be unrelated to a particular merchant. In one embodiment, the knowledge search engine 160 includes a voice-recognizer implemented in the natural-language processor 230. The voice-recognizer can transform an expression received from a user into a different mode of information. This mode can be text or other types of data representation. For example, a text search or a voice dictated search may yield a knowledge search card in response. Further aspects of the knowledge search card are detailed below with respect to FIG. 3. In other embodiments a natural language processor is not used. In such instances a merchant user may choose keywords, and knowledge search engine 160 may search such for such keywords in the input query.

To access the knowledge search engine 160, a piece of software code written in a scripting language (e.g., a Javascript) may be installed or otherwise executable by a merchant system 203. For example, a script tag may be linked or associated with a search box provided by a third-party website (e.g., provider API 210), executable via the merchant's website, or a merchant's own website (e.g., first-party site 150-1), or provided in any suitable webpage html for a web page where an end user may initiate a search. When the webpage is rendered with a script tag, the script tag is pointe to a script on a server that executes in response to the loading of the by a browser of a user device. The webpage including the script tag is delivered to the user device over a suitable connection (e.g., an Internet connection) for use by the browser of the user device. In an embodiment. the server initializes the knowledge search engine 160 using information provided in the search query 209 and provides a response to the search query 209 to the user device 207.

In operation, knowledge search engine 160 may receive input (in the form of a search query 209) from an end user via the user device 207. In some embodiments the search query is made to merchant's website (e.g., first-party site 150-1), or third-party site, which is communicatively coupled to source system 101. This input may include, for example, voice, text and gestures of the user at the display of the device. For example, the gestures may include swipe right on a screen to search for agents based on geolocation, swipe up to call the agent, swipe down to chat with an agent via a chat interface, swipe left to choose a different agent and other types of gestures. The knowledge search engine 160 delivers the user input of the search query 209 to the natural language processor 230. In some embodiments, the natural language processor 230 processes the input to process the input in a natural language context. The natural language result can then be supplied to the structured response builder 240. In other embodiments, the keywords found in the input query can be sent to the structured response builder 240. Once processed in the natural language format, the input can be used to direct the structured response builder 240 to perform one or more actions (e.g., select knowledge information from one or more prescribed product data sites/databases, launch an application, etc.). For example, the natural language processor 230 can process the user input to enable the structured response builder 240 to extract, from a database 204, a piece of information relevant to the input. In one embodiment, by transforming the search query 209 to natural language, the natural language processor 230 may extract one or more elements of information, in the event the initial search query is ambiguous or incomplete. In one embodiment, if an ambiguity associated with the search query 209 is not resolved, the knowledge search engine 160 can provide the end user with a number of alternatives associated with the search input to resolve the ambiguity or otherwise solicit clarification for the user.

In one illustrative example, a search query 209 for a common surname combined with a reference to a recognizable location results in a correctly prioritized response. In that regard, the knowledge search engine 160 may provide formulated information (e.g., structured data) regarding the response at a display of the user device 207 in accordance with the natural language inquiry derived from the search. Where the intent of the user is less clear or ambiguous (such as with respect to location), the knowledge search engine 160 provides the merchants to which the search is directed with the control over which branch of the merchant (e.g., when a merchant has multiple locations or branches) to display first. For example, if a business has many branches in one area, nearby branches within a certain threshold of the location of the user device 207 are presented first, followed by particular information about those nearby branch locations. For example, the geographically closest merchants to the zip code in the search string are presented to the end user via knowledge search cards windows of the webpage, along with relevant information about the merchants. In one embodiment, the end user may choose to add an additional filter to the search by clicking the (+) control button and selecting additional search criteria (e.g., a category) and/or selecting a parameter value. In one embodiment, the results of the knowledge search engine 160 are filtered further to just one advisor that is the perfect match with the user's query 209.

In some embodiments, the knowledge search engine 160 may provide a response to a search query 209 in a dialogue extension interface 250 presented at a display of the user device 207 in accordance with the natural language inquiry 230 derived from the search query 209. For example, the knowledge search engine 160 may support a chatbot that the user can invoke directly from the search window. For a search query 209 in which there is a known match to a subject that is a commonly asked-about topic, there are suggested responses, including "chat with our virtual employee of the business." This allows an end user to have a conversation with the chatbot to help guide them to a solution, such as narrowing down the search for a relevant advisor, or helping match the end user needs with advisors near them that provide a certain good or service. In some embodiments, the end user may automatically be connected with an employee or contractor of the related merchant, instead of a chatbot. For example, if a user device 207 searches for an "insurance agent near me," the insurance agent geographically closest to the user device 207 may be connected with the user device 207 via a chat interface. The merchant may be chosen based on the IP address of the user device 207, information inputted into the search query 209 and/or information associated with the end user based on its previous searches or registered account information. In another embodiment, the knowledge search engine 160 may place a call via the user device 207 to an agent or employee associated with the merchant 203. If the agent or employee is not available for a chat interface or a call, then the knowledge search engine 160 may return a knowledge search card to the end user. In other embodiments, the natural language processor 230 can process the user input to enable the structured response builder 240 to build other structured responses other than a dialogue extension interface 250. Such other structured responses, may include, but are not limited to maps, a knowledge card, directions to a location, a button to call a car service (e.g., Uber™ or Lyft™). In other embodiments, based on the processing of the search query 209, more than one structured responses may be returned (e.g., a map to a location with a button to call a car).

In an embodiment, in the event the search query 209 is vague or ambiguous, the knowledge search engine 160 may suggest some examples of information the end user may include in the search query 209. The one or more suggestions may include, for example, a suggestion to the end user to submit a search such as: find a business near a zip code, find a business near a zip code with Spanish speaking employees, find a phone number for business and today's office hours for particular branch, identify events related to the business that are geographically proximate to the end user, etc. In some embodiments, based on the search query 209, the knowledge search engine 160 may identify one or more gaps in the knowledge regarding a merchant. In such cases, the knowledge search engine 160 may instruct the knowledge search engine 160 to use knowledge assistant component 162 to request further information from the merchant user about the merchant, such as, for example, a request to determine whether a particular store associated with the merchant sells kosher items or store operating hours. The knowledge search engine 160 may then send recommended updates to a merchant system 203 to update the merchant's website and/or databases and/or source system 115 with the information identified to address the identified"gap". In addition this information may be automatically pushed to first-party site 150-1 and one or more third-party sites.

In some embodiments, the knowledge search engine 160 may include a prompt module (not shown in FIG. 2A) providing prompts or search tips (e.g., presented data, such as word, images, audio etc., at the user device 207) based on the user input. The prompts may be used to help end users formulate and submit search queries 209. In one embodiment, the knowledge search engine 160 selects one or more predetermined search tips. For example, for a search relating to identifying the location of a store associated with a merchant, the knowledge search engine 160 may provide one or more of the following example prompts: "find open stores near me", "what time does the store near me close", "give me directions to 10010 Location Avenue", "what is the phone number of the Any Town location of the merchant".

In one embodiment, a merchant system 203 may implement a custom prompt, such as, for example "find me an agent that has 30 plus years of experience".

In some embodiments, the knowledge search engine 160 may return to the user, by default, the most likely answer it determines that the user is looking for. In some embodiments, the knowledge search engine 160 may be layered with additional biasing to improve results. For example, the knowledge search engine 160 can provide biasing search results based on a familiarity with a topic. In an example, the search results may be biased by a location. If the website (and/or knowledge search engine 160) identifies the location of the end user (through IP address, or by asking them) then the knowledge search engine 160 may bias the results to the geographically proximate merchant locations, events, etc. In one or more embodiments, the location of the end user may be known via information that the end user may have previously entered via an input query, or information stored through a user registration process. In some embodiments, the knowledge search engine 160 may store multiple inquires associated with the previously entered inquiries at the user device 207 and adapt results based on those previous inquiries.

In other embodiments, the knowledge search engine 160 can bias the results of a search query 209 based on the type of page the user is searching from their user device 207. For example, if a user is searching from an events page, the user may be more likely to look for other events. In such cases, the knowledge search engine 160 may bias events higher within the results.

The knowledge search engine 160 may bias results based on specific user data. For example, the knowledge search engine 160 may receive information about a user that includes the user's net worth, credit score, etc. If the knowledge search engine 160 determines that the user who is searching is a very high value potential customer, the knowledge search engine 160 may choose to route them to one of the best advisors associated with a merchant. For example, the knowledge search engine 160 may bias the results to show only top tier advisors. In other embodiments, the dialogue extension interface 250, or certain versions of the dialogue extension interface may only be presented to the highest valued customers. For example, if an end user is rated as a high value customer, the end user may be connected to a live agent, instead of a chatbot.

In order to improve the performance, the knowledge search engine 160 may add synonyms to any custom fields and knowledge relationships. For example, synonyms may be generated and associated with certain phrases such that even when queries do not include the phrases, the synonyms may be used to map queries to the reserved phrases and the associated content. In other embodiments, the synonyms may be added manually. The synonyms help the knowledge search engine 160 to match answers to exactly what the user is looking for. For example, the phone number fields in a search might be referred to as phone, number, call, dial etc. The knowledge search engine may add synonyms for all standard built-in fields. If the users often search for a custom field or a relationship, synonyms can improve the knowledge search engine 160.

In an embodiment, the knowledge search engine 160 may be trained to map certain searches to a predetermined or structured response. This allows the merchant to map searches that do not have an organic match to a structured response. For example, a search query 209 that does not have organically derived results can be associated with a predetermined result. In an embodiment, this serves to "fix" the current search query and similar search queries on a going forward basis. In an embodiment, the knowledge search engine 160 may learn from the training phase to show better results for similar queries.

In one or more embodiments, an end user may submit advanced queries like "I need auto insurance in zip code 10010" and the knowledge search engine can respond by presenting a chat style interface. In an embodiment, the chat interface responsive to a search query 209 may be integrated with a merchant system. For example, the interface may be coupled to a customer-relationship management (CRM) system to provide a notification to a salesperson regarding a potential new lead. In some embodiments, the knowledge search engine dialogue extension interface 250 can also operate in conjunction with an end user's mobile device 207. For example, the interface 250 can be integrated into an application or a mobile website. The interface 250 may be exposed via application directory integrations to chatbot experiences or voice calls via the user device 207.

In some embodiments, the knowledge search engine 160 supports custom knowledge cards. The custom knowledge cards allow ends users to handle common searches that may not be covered by entities in the knowledge search engine. An example of this is when end users search for a login to an account on a business website, such as "I forgot my password", "I can't login", "what is my routing number?", etc. After this custom card is added, a result will be surfaced in the knowledge search engine to direct the end user to the login page. In some embodiments, custom Cards direct end users to commonly accessed pages or assets via the knowledge search engine. Aspects of the knowledge cards are further discussed with respect to FIGS. 3A-3C.

FIGS. 3A-3C illustrates examples of structured knowledge data in accordance with one or more aspects of the disclosure. In FIG. 3A, a knowledge search card 300 is shown. The knowledge search card 300 may include, in part, data in a structured form. The data may include, but is not limited to, a name, website, address, phone number, photograph, quotes and links to third party sites with relevant information. A knowledge search card 300 presents data in a form that is easily digestible to allow users via a user device to find the information that they are looking for. In some embodiments, the knowledge search card 300 is generated automatically based on data that is stored in one or more databases. The stored data may be structured using schema.org vocabulary.

In some embodiments, the knowledge search engine 160 adds rich entity search to websites and instead of blue links, it provides answers. It answers all sorts of questions just like a search engine would. For example, if a user searched for "Agents near me," the knowledge search engine 160 returns structured answers as to what the users are looking for. For example, the knowledge search engine 160 may return the knowledge search card 300. Each entity within a business may have a knowledge search card 300 that is used to show up in search results. It includes the key information as well as the key CTAs and transactions. The enterprise user depending on what's important to them may customize these knowledge cards. In some aspects, the cards 300 may include links to the full knowledge page for further details regarding the business or entity.

In other embodiments, the knowledge search engine user (for example, a Merchant) may create template knowledge search cards 300 that may be presented to a user device that is conducting a search based on a input inquiry. The knowledge search cards 300 can be easily accommodated on a display of the user device, such as mobile screens. Behind the search is a powerful AI knowledge search engine that intuitively interprets the user's intent and provides results that best represent the businesses product brand data. In other embodiments, other results may be returned instead of knowledge cards based on the natural language inquiry. For example, instead of a URL, the knowledge search card 300 provides structured results that include the actual data the user is looking for, which is displayed in a UI that makes sense depending on the type query results. The results may include, but are not limited, to a map that shows the location of a business or an individual that works at the business, a dialogue extension interface as shown in the mobile device 320 of FIG. 3B, and/or an event calendar and/or showing a location on map as shown in web Browser 330 of FIG. 3C, and or directions to a location and/or a button to call a car service.

FIGS. 4, 5, 6 and 7 illustrates flow diagrams of example methods 400, 500, 600 and 700, to implement a knowledge search engine platform for enhanced business listings in accordance with one or more aspects of the disclosure. In one embodiment, the knowledge search engine 160 of FIG. 1A may perform methods 400, 500, 600 and 700 to implement a knowledge search engine platform for enhanced business listings. The methods 400, 500, 600 and 700 may be performed by processing logic that may comprise hardware (circuitry, dedicated logic, etc.), software (such as is run on a general purpose computer system or a dedicated machine), or a combination of both. Alternatively, in some other embodiments, one or more processors of the computer device can execute various routines, subroutines, or operations to perform methods 400, 500, 600 and 700 and each of its individual functions. In certain embodiments, a single processing thread may perform methods 400, 500, 600 and 700. Alternatively, two or more processing threads with each thread executing one or more individual functions, routines, subroutines, or operations may perform methods 400, 500, 600 and 700. It should be noted that blocks of method methods 400, 500, 600 and 700 can be performed simultaneously or in a different order than the examples depicted.

Figure 4:
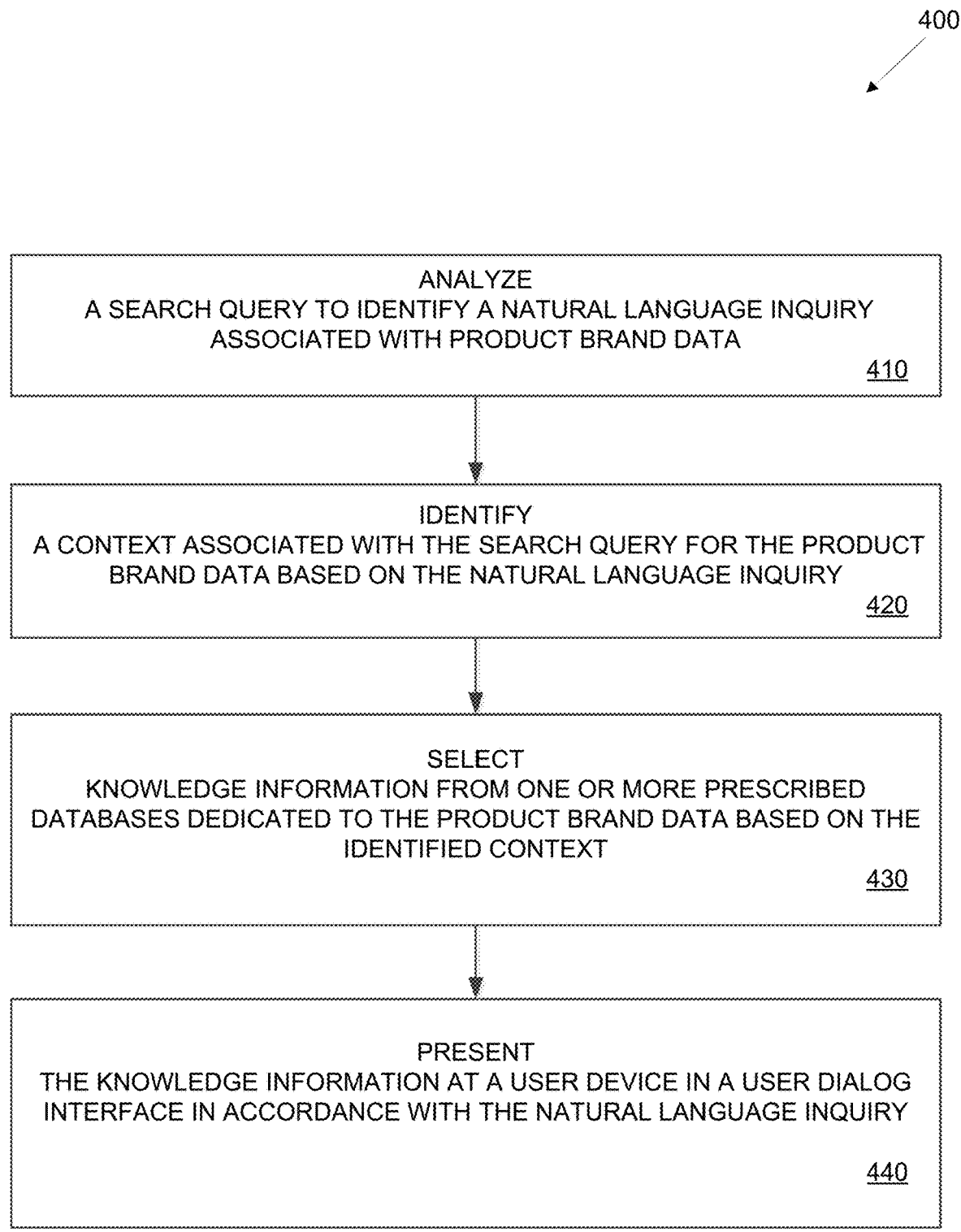
FIG. 4 illustrates a flow diagram of an example method to implement a knowledge search engine platform for enhanced business listings in accordance with one or more aspects of the disclosure.

Turning to FIG. 4, method 400 begins in block 410 where a search query to identify a natural language inquiry associated with product brand data is analyzed. In block 420, a context associated with the search query for the product brand data is identified based on the natural language inquiry. In block 430, knowledge information is selected from one or more prescribed databases dedicated to the product brand data based on the identified context. In block 440, the knowledge information is presented at a user device in a user dialog interface in accordance with the natural language inquiry. In other embodiments, instead of presenting the data in a user dialog interface (like dialog extension interface 250), the data may be presented in a different structured response, including, but not limited to, knowledge cards, maps, directions, etc.)

Figure 5:
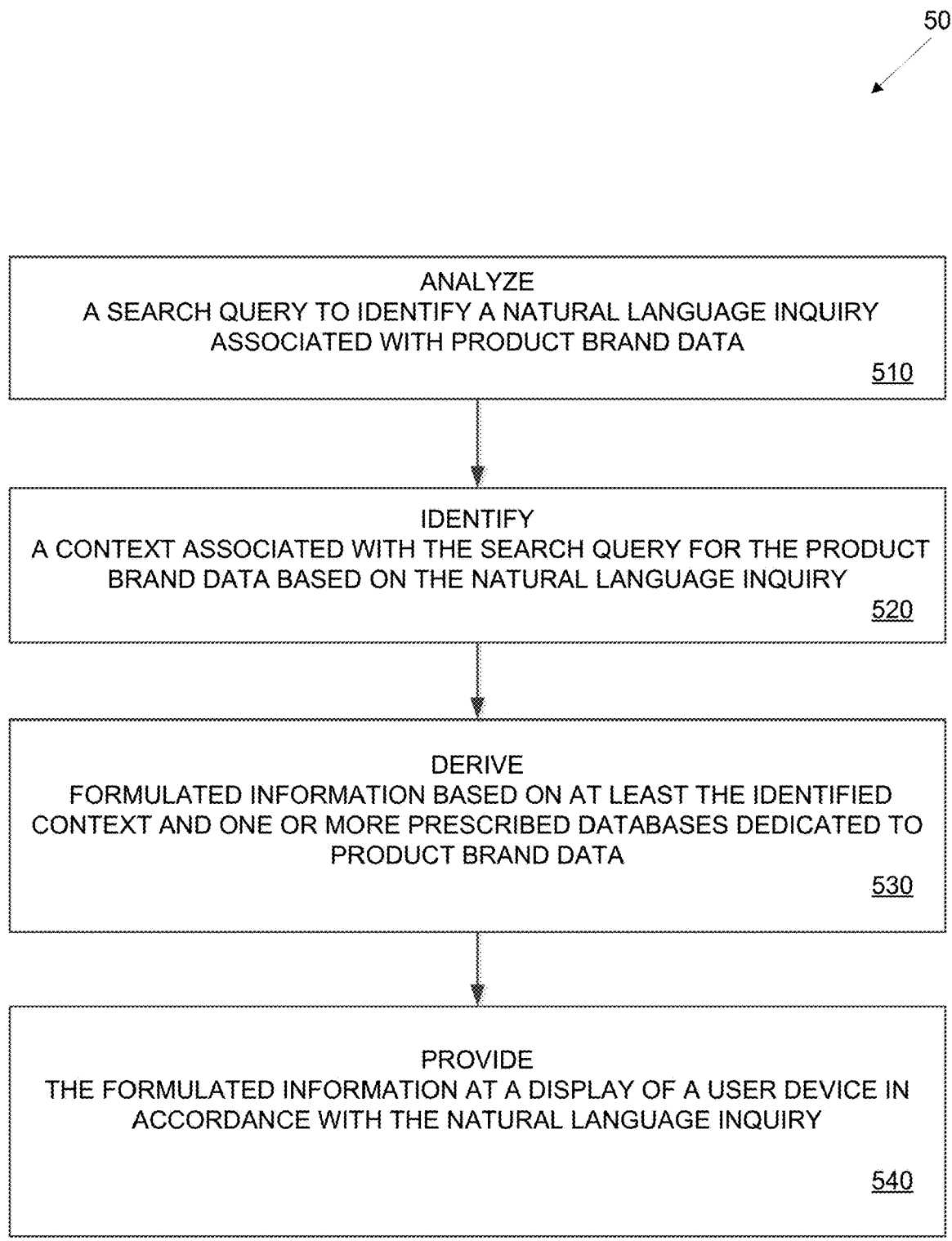
FIG. 5 illustrates a flow diagram of an example method to implement a knowledge search engine platform for enhanced business listings in accordance with one or more aspects of the disclosure.

In FIG. 5, method 500 begins in block 510 where a search query to identify a natural language inquiry associated with product brand data is analyzed. In block 520, a context associated with the search query for the product brand data is identified based on the natural language inquiry. In block 530, formulated information is derived based on at least the identified context and one or more prescribed databases dedicated to product brand data. Thereupon, the formulated information is provided at a display of a user device in accordance with the natural language inquiry in block 540. For example, the structure response builder 240 may, based on the inquiry, automatically create different structured responses (e.g., maps, knowledge cards, directions, etc.).

Figure 6:
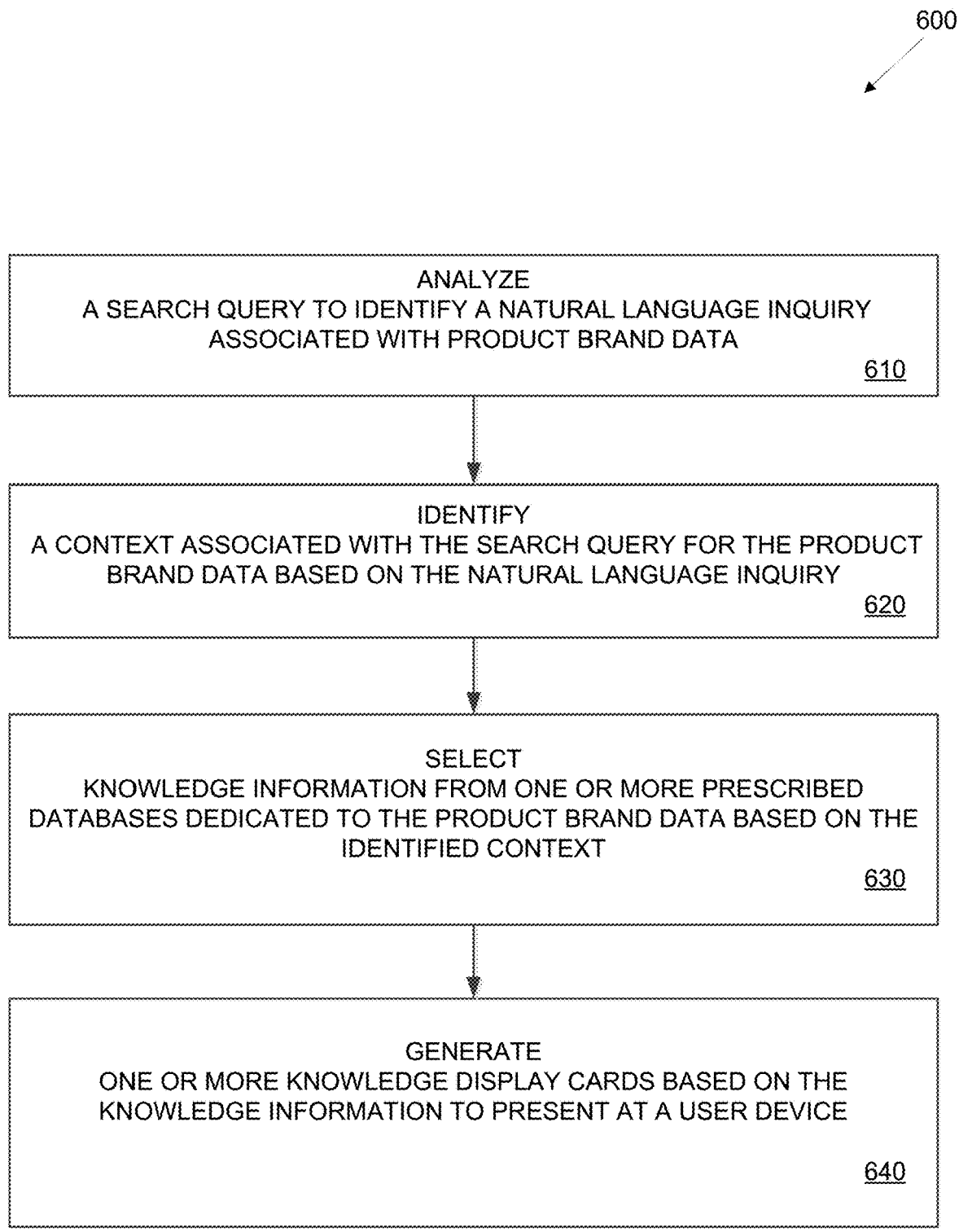
FIG. 6 illustrates a flow diagram of an example method to implement a knowledge search engine platform for enhanced business listings in accordance with one or more aspects of the disclosure.

In FIG. 6, method 600 begins in block 610 where a search query to identify a natural language inquiry associated with product brand data is analyzed. In block 620, a context associated with the search query for the product brand data is identified based on the natural language inquiry. In block 630, knowledge information is selected from one or more prescribed databases dedicated to the product brand data based on the identified context. Thereupon, one or more knowledge display cards to present at a user device are generated based on the knowledge information in block 640.

Figure 7:
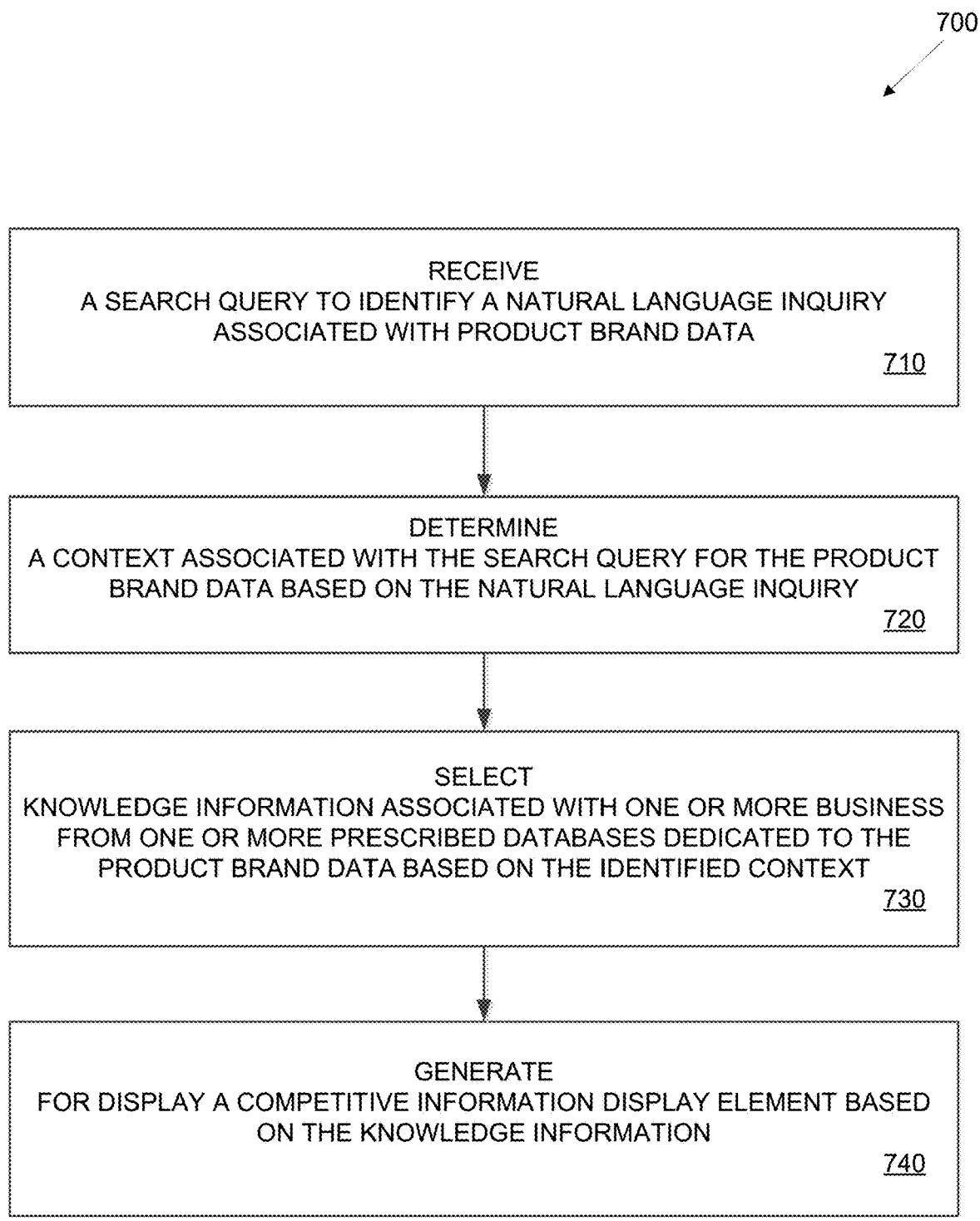
FIG. 7 illustrates a flow diagram of an example method to implement a knowledge search engine platform for enhanced business listings in accordance with one or more aspects of the disclosure.

With respect to FIG. 7, method 700 begins in block 710 where a search query to identify a natural language inquiry associated with product brand data is received. In block 720, a context associated with the search query for the product brand data based on the natural language inquiry is determined. Knowledge information associated with one or more business from one or more prescribed databases dedicated to the product brand data is selected in block 730 based on the identified context. Thereupon, a competitive information display element generate for display in block 740 based on the knowledge information. The competitive information display element indicates that competitive information related to the one or more businesses with respect to the product brand data is available.

In some embodiments, a search query (e.g., a natural language query or any other type of query) associated with product brand data is received. In response, the source system (e.g., source system 101 of FIG. 1A) accesses a source system database (e.g., source system database 115 of FIG. 1A) to determine if product brand data responsive to the search query is present or stored in the database. In an embodiment, in the event the source system determines that responsive product brand data is not stored in the database, the source system (using the knowledge assistant component 162 of FIG. 2) may establish a communication with a corresponding merchant system (e.g., a merchant system associated with the product brand data associated with the query) to request an update relating to the requested product brand data. In some embodiments, the source system receives the updated product brand data and stores the data in the source system database.

For example, the initial query may be for first product brand data (e.g., holiday hours) associated with a first merchant. In response to the query, the source system reviews the source system database for the requested information about first merchant. If the source system determines that the requested information is not stored in the source system database, the source system generates a request for transmission to the first merchant to obtain the first product brand data. In some embodiments, in response to receiving the first product brand data from the first merchant, the source system updates the source system database to include the first product brand data.

Figure 8:
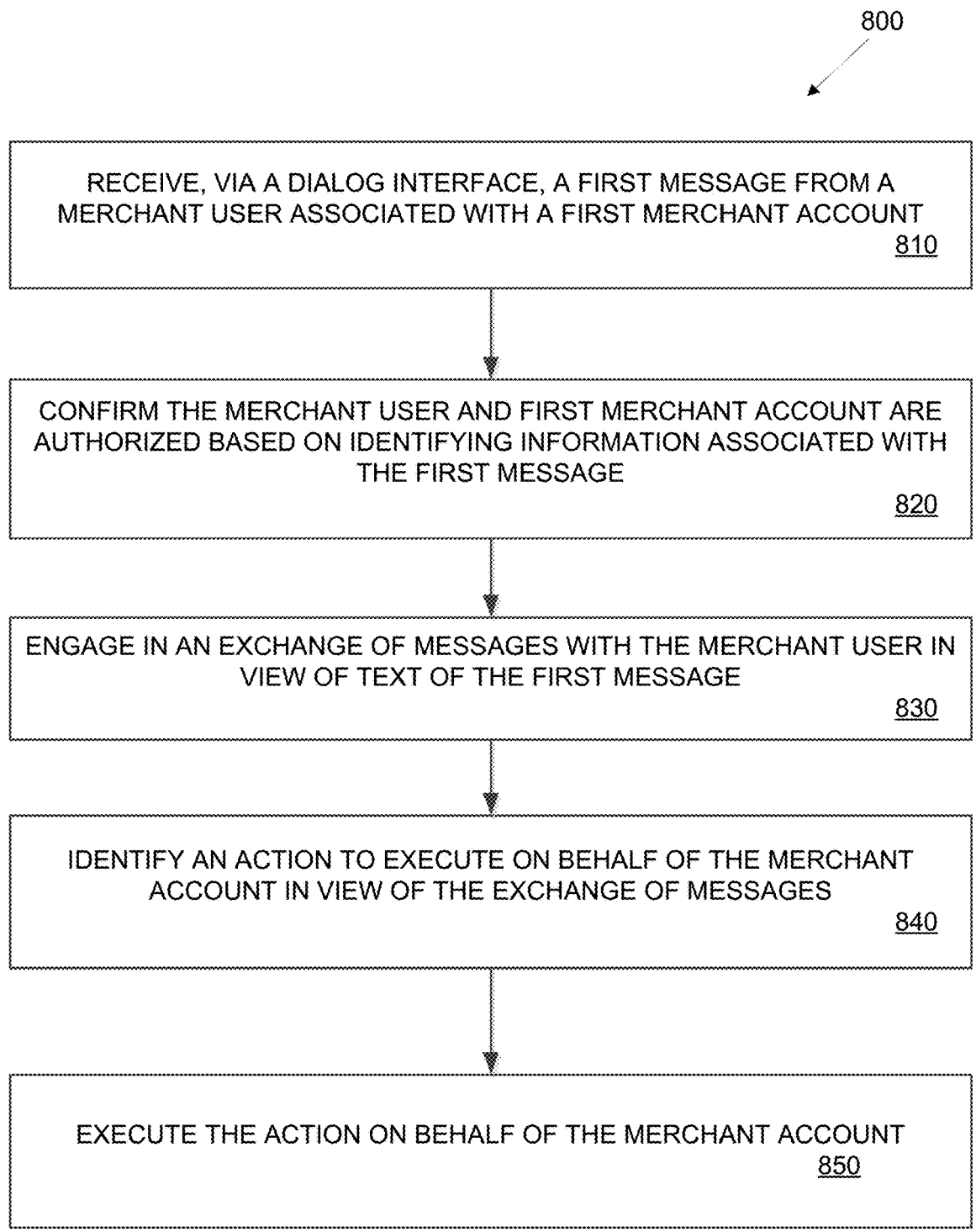
FIG. 8 illustrates a flow diagram of an example method to execute actions in response to a merchant-initiated request in accordance with one or more aspects of the disclosure.

FIG. 8 illustrates a flow diagram of an example method 800 to execute actions on behalf of a merchant system, in accordance with one or more aspects of the disclosure. In one embodiment, method 800 may be performed by the knowledge assistant component 162 of FIGS. 1A and 2A to implement changes or updates to information associated with a merchant system or account based on a dialogue exchange with a merchant user. Method 800 may be performed by processing logic that may comprise hardware (circuitry, dedicated logic, etc.), software (such as is run on a general purpose computer system or a dedicated machine), or a combination of both. Alternatively, in some other embodiments, one or more processors of the computer device may perform various routines, subroutines, or operations in accordance with method 800 and each of its individual functions. In certain embodiments, a single processing thread may perform method 800. Alternatively, two or more processing threads with each thread executing one or more individual functions, routines, subroutines, or operations may perform methods 800. It should be noted that blocks of method 800 can be performed simultaneously or in a different order than that depicted.

In block 810, a dialog interface communicatively coupled to the knowledge assistant component may receive a first message from a merchant user associated with a first merchant account or system. In some embodiments, the first message may be a text communication or a chat communication including text, one or more attachments, or a combination thereof. In some embodiments, method 800 is initiated by a communication received from the merchant user. In some embodiments, the dialog interface may include an interface configured to process and exchange messages between the merchant user and the knowledge assistant component, such as, for example, an interface of a communication platform (e.g., a Facebook Messenger) communicatively connected to the knowledge assistant component.

In block 820, the processing logic confirms the merchant user and the first merchant account are authorized to request an action based on identifying information associated with the first message. In some embodiments, the first message may include information that may be analyzed to identify the merchant user and/or the merchant account, such as, for example, a username, a merchant account name, login/password information, a code or other identifier, an IP address associated with the first message, etc. In some embodiments, one or more constraints or limits may be associated with a merchant user, such that, for example, a merchant user may only be able to update information about one or more specific locations. If a merchant tries to update information about locations it is not authorized to manager, knowledge assistant may automatically determine the correct or authorized merchant user, and send a message to such user to update the particular information. For example, a hierarchy of permissions may be established for a merchant system such that roles and/or users are assigned to types or categories of information for which they are permitted to requested and execute changes. In some embodiments, the knowledge assistant performs a review of the associated permissions to determine if a merchant user requesting a change or update is permitted or authorized to execute the requested update. If it is determined that a first merchant user is not permitted to effectuate the requested change/update, the knowledge assistant may use the permission information to identify one or more other merchant users that are authorized to execute the requested change.

In block 830, having validated the merchant user and associated merchant account, the processing logic engages in an exchange of messages with the merchant user in view of the text or other input associated with the first message. In an embodiment, the exchange of messages may include one or more messages generated by the processing logic to prompt the merchant user for additional information to be used to identify an action to perform on behalf of the merchant account. For example, the exchange of messages may include one or more questions from the knowledge assistant component that are used to determine the action being requested by the merchant user. In an example, the exchange of messages may include a message including a list of actions that the merchant user may select from. In an example, the exchange of messages may include a dialogue wherein messages received from the merchant user are analyzed to determine an appropriate response.

In block 840, the processing logic identifies an action to execute on behalf of the merchant account in view of the exchange of messages. In some embodiments, the action may include changing, updating, or modifying information associated with the merchant account. For example, the action may include adding a photo to the merchant account and/or source system database 115 (and one or more first and third party sites 150), changing information associated with the merchant account (e.g., hours of operation, address information, etc.), updating a portion of the merchant account accessible by an end user, etc. In some embodiments, the processing logic may identify one or more entities associated with the merchant account for which the action is to be performed. In some embodiments, the processing logic may generate a message to the merchant user requesting an identification of one or more entities (e.g., stores/locations associated with a merchant) for which the action is to be performed. For example, the processing logic may manage multiple different entities (e.g., stores/locations) associated with the merchant account and may determine, based on the exchange of messages, which entities are to be impacted by the action. In an example, the action may be to "update the holiday hours" for the entities of the merchant located in the Eastern time zone.

In block 850, the processing logic executes the action on behalf of the merchant account. In some embodiments, the action may be executed on behalf of the entire merchant account (e.g., the posting of an image to the merchant account's primary profile) or one or more entities associated with the merchant account (e.g., specific stores or locations associated with the merchant). In some embodiments, the merchant user is requesting knowledge assistant component 162 to update information in source system database 115. By submitting a response to knowledge assistant component including such data, knowledge assistant component 162 automatically updates source system database 115 with such information and automatically pushes such information to first party and third party sites. In some embodiments, a merchant user may only be able to update information about one or more specific locations. If a merchant tries to update information about locations it is not authorized to manage, knowledge assistant may automatically determine an authorized merchant user, and send a message to the identified authorized merchant user to update the particular information. In some embodiments, the authorized merchant user identified can respond any update the applicable information. In some embodiments, a message may be sent to the first authorized user letting them know that they are not authorized.

Figure 9:
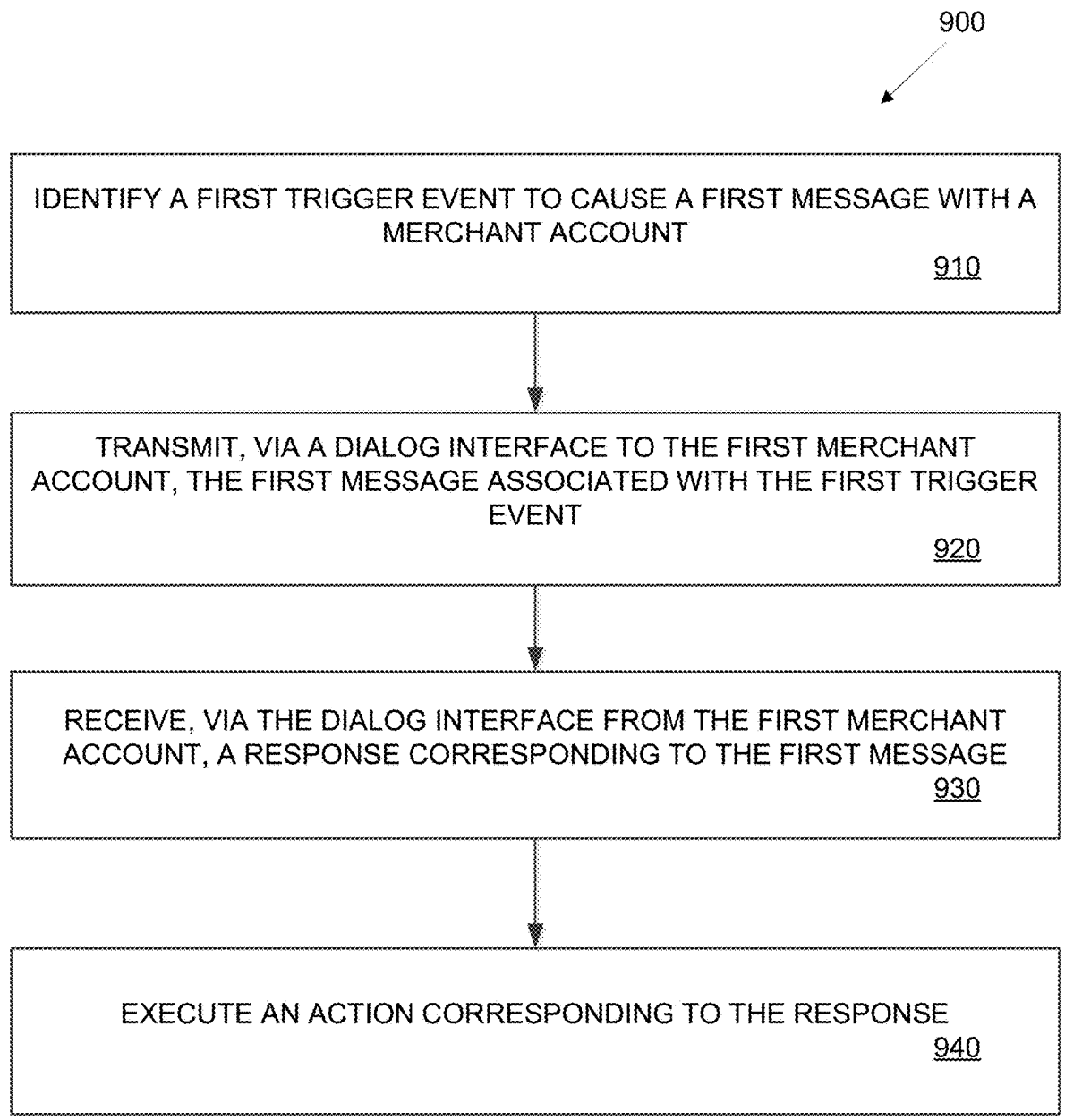
FIG. 9 illustrates a flow diagram of an example method to execute actions associated with a system-initiated exchange of messages with a merchant system in accordance with one or more aspects of the disclosure.

FIG. 9 illustrates a flow diagram of an example method 900 to execute actions on behalf of a merchant system, in accordance with one or more aspects of the disclosure. In one embodiment, method 900 may be performed by the knowledge assistant component 162 of FIGS. 1A and 2A to implement changes or updates to information associated with a merchant system or merchant account based on a system-initiated dialogue exchange with a merchant user. Method 800 may be performed by processing logic that may comprise hardware (circuitry, dedicated logic, etc.), software (such as is run on a general purpose computer system or a dedicated machine), or a combination of both. Alternatively, in some other embodiments, one or more processors of the computer device may perform various routines, subroutines, or operations in accordance with method 900 and each of its individual functions. In certain embodiments, a single processing thread may perform method 900. Alternatively, two or more processing threads with each thread executing one or more individual functions, routines, subroutines, or operations may perform method 900. It should be noted that blocks of method 900 can be performed simultaneously or in a different order than that depicted.

In block 910, the processing logic identifies a first trigger event associated with a merchant system or merchant account. In some embodiments, the first trigger event is some activity, action, message, communication, alert, notification, etc. that calls for some responsive action by the merchant account. For example, the trigger event may be a communication from an end user, such as, the posting of an end user (e.g., customer) comment via a social media platform regarding the merchant (e.g., a customer's review of the merchant restaurant), identification of an upcoming date event (e.g., an approaching holiday, season, time, promotion, marketing event, etc.), identification of end user information requiring confirmation or update, etc.

In block 920, in response to the trigger event, the processing logic transmits, via a dialog interface to a merchant account, a message associated with the trigger event. For example, for a trigger event including a new customer review, the message to the merchant account may include the customer review and a prompt to provide a response to the customer. For example, the processing logic may generate a message indicating "You have a new 4 star review posted on Facebook from Jane Doe: "I love this place. I wish they had the Redskins' game on though." In some embodiments, the processing logic determines a platform (e.g., SMS, Facebook, Yelp, etc.) having a dialog interface for the communications with the merchant account.

In block 930, the processing logic receives, via the dialog interface from the merchant account, a response corresponding to the first message. In some embodiments, the response may include text, graphics, links, images, videos, etc. that are intended to be responsive to the first message. In the above example, the processing logic may receive a response message from the merchant account indicating "Thanks for coming! We'll make sure the Redskins' game is on next Sunday. Please come again!" In some embodiments, if the merchant user contacted doesn't respond, knowledge assistant component 162 may automatically send a second message to a second merchant user to make the update. In some embodiments the knowledge assistant component 162 may send a message to the first user letting them know that another user took care of the request.

In block 940, the processing logic executes an action corresponding to the response received from the merchant account. In some embodiments, the action may include posting or providing a message to an end user (e.g., a customer) including the response corresponding to the first message, storing the response in the merchant's account, etc. In some embodiments, the processing logic may confirm that the merchant account approves of the action prior to execution of the action. In the above example, the processing logic may execute the transmitting (e.g., posting or pushing) of the response to the end user corresponding to the trigger event. In some embodiments, the merchant user is requesting knowledge assistant component 162 to update information in source system database 115. By submitting a response to knowledge assistant component including such data, knowledge assistant component 162 automatically updates source system database 115 with such information and automatically pushes such information to multiple first party and third party sites. In some embodiments, advantageously, any update to the merchant data that is received and processed by the knowledge assistant may be distributed to the one or more listings or profiles associated with the merchant. In some embodiments, the distribution or dissemination of the merchant data is executed by the knowledge assistant and may include the updating of listings and profiles on various different platforms, locations, databases, etc. on behalf of the merchant system. In this regard, the merchant system may interact with the knowledge assistant to implement a change or update to their data via a single interface and have the updated data promulgated to various different websites (e.g. a first-party site and multiple third-party sites), without having to execute the update at each of the various locations/sites.

In some embodiments, the triggering actions and actions executed by the processing logic in methods 800 and 900 may include one or more of the following interactions: upload photo to gallery, change a featured message, change hours (either immediate or scheduled and either regular or holiday), request analytics information, request reviews information, provide geographic coordinates associated with a location/entity; update menu items, add a calendar event, create a social media post, indicate Holiday hours, review a response, perform data confirmation (e.g., store hours, phone number information, website information, etc.), photo content capture, publisher data suggestion, link to an analytics dashboard, provide an unavailable listing notification, post and/or respond to a new review, suppress duplicate data, perform competitive intelligence analysis, etc.

In some embodiments, in methods 800 and 900, the processing logic may maintain information indicating permissions associated with a merchant account which indicate the individuals or groups associated with the merchant account that are permitted to request the execution of actions. These permissions may be used in the management of the merchant account via the knowledge assistant component and have actions executed.

Figure 10:
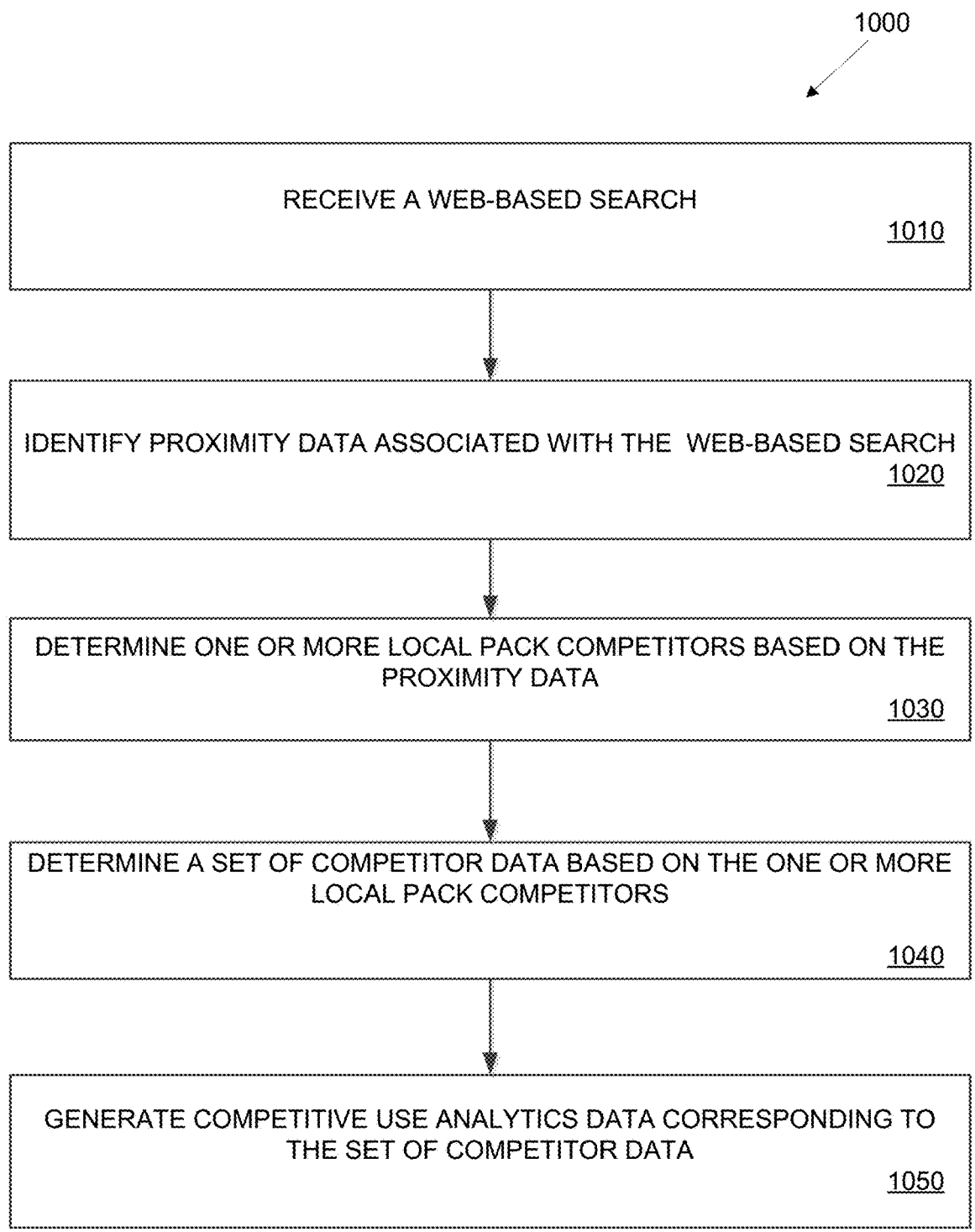
FIG. 10 illustrates a flow diagram of an example method to manage competitor data associated with a merchant system in accordance with one or more aspects of the disclosure.

FIG. 10 illustrates a flow diagram of an example method 1000 to identify and generate competitor information associated with a merchant user, in accordance with one or more aspects of the disclosure. In one embodiment, method 1000 may be performed by the competitor intelligence component 164 of FIGS. 1A and 2A to provision competitor information associated with a merchant system. Method 1000 may be performed by processing logic that may comprise hardware (circuitry, dedicated logic, etc.), software (such as is run on a general purpose computer system or a dedicated machine), or a combination of both. Alternatively, in some other embodiments, one or more processors of the computer device may perform various routines, subroutines, or operations in accordance with method 1000 and each of its individual functions. In certain embodiments, a single processing thread may perform method 1000. Alternatively, two or more processing threads with each thread executing one or more individual functions, routines, subroutines, or operations may perform method 1000. It should be noted that blocks of method 1000 can be performed simultaneously or in a different order than that depicted.

In some embodiments, the competitor intelligence component allows merchant users to identify competitors (including competitors the merchant may not be aware of) by automatically searching a local pack (e.g., food near me) to return results of potential competitors. In some embodiments, the local pack competitors may be identified in a section of a search provider's (e.g., Google®) search results that present merchant locations in a particular geographic area based on search terms submitted via search provider interface and/or the location of the user. In some embodiments, the "local pack" may include, but is not limited to, a map that shows the location of specific locations and a list of such locations with relevant information (e.g., name of business, address of business, distance from user, business hours, etc.). The local pack results may include, for example, local pack competitors and/or local pack advertisements. The local pack may be within proximity of an indication of location of where the user is searching from (based on their IP address) or the location the user has entered in their search phrase. The data for determining the local pack may be obtained from searches run for each business using the source system. For example, the local pack may be within proximity of an indication of location of where the user is searching from (based on their IP address) or the location the user has entered in their search phrase.

In block 1010, the processing logic receives a web-based search for information relating to one or more merchants. For example, the search may include search criteria (e.g., an input query) entered by an end user seeking information.

In block 1020, the processing logic identifies proximity data associated with the web-based search. In some embodiments, the proximity data is information relating to a location of the end user (e.g., based on an IP address of the end user device or from the search criteria itself), a location of a subject of the search (e.g., a search directed to "movie theaters in Anytown, USA"). In an embodiment, the proximity data may include a geographic region (e.g., a geographic radius corresponding to a location relating to the search).

In block 1030, the processing logic determines one or more local pack competitors based on the proximity data. In some embodiments, the processing logic uses the proximity data to identify one or more competitors corresponding to a merchant system.

In block 1040, the processing logic determines a set of competitor data based on the one or more local pack competitors. In some embodiments, the set of competitor data may be any data relating to the local pack competitors including, but not limited to, hours of operation, address, events, promotions, sales information, marketing information, etc.

In block 1050, the processing logic generates competitive use analytics data corresponding to the set of competitor use analytics data. In some embodiments, the competitive use analytics data is provided to a merchant associated with the local pack. In some embodiments, one or more reports or other outputs may be generated based on the competitive use analytics data. Advantageously, the merchant system may obtain competitive use analytics data about one or more competitors in the local pack that the merchant system may not have been aware of. In some embodiments, the competitor intelligence component 164 may process the data it receives from its searches, determine if there are any gaps in knowledge in source system database 115 and the knowledge assistant component 162 contacts an applicable merchant user to update the database, based on such gap in knowledge.

Figure 11:
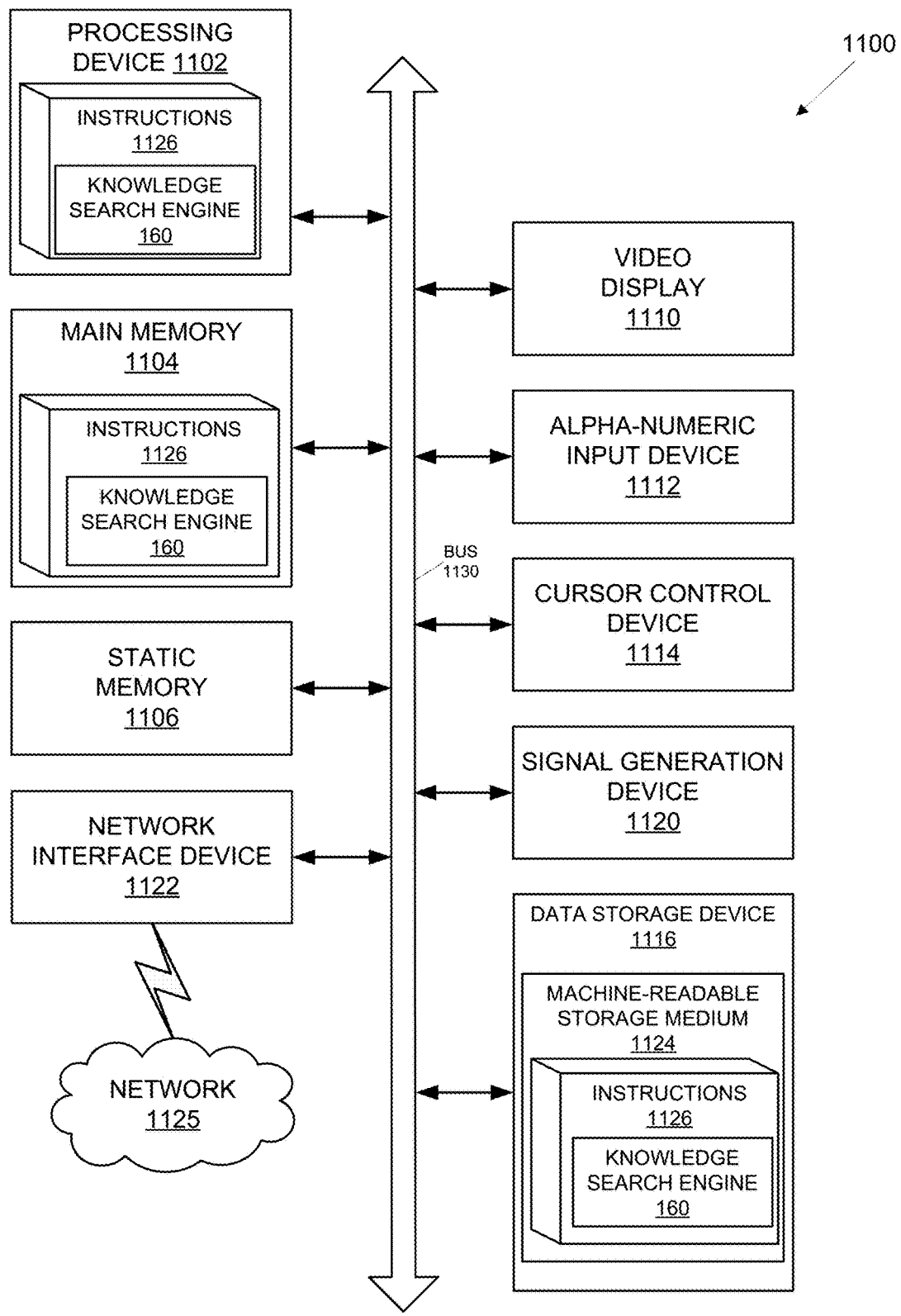
FIG. 11 illustrates an example computer system operating in accordance with some embodiments of the disclosure.

FIG. 11 illustrates an example computer system 1100 operating in accordance with some embodiments of the disclosure. In FIG. 11, a diagrammatic representation of a machine is shown in the exemplary form of the computer system 1100 within which a set of instructions, for causing the machine to perform any one or more of the methodologies discussed herein, may be executed. In alternative embodiments, the system 1100 may be connected (e.g., networked) to other machines in a local area network (LAN), an intranet, an extranet, or the Internet. The system 1100 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that system 1100. Further, while only a single machine is illustrated, the term "machine" shall also be taken to include any collection of machines that individually or jointly execute a set (or multiple sets) of instructions to perform any one or more of the methodologies discussed herein.

The example computer system 1100 may comprise a processing device 1102 (also referred to as a processor or CPU), a main memory 1104 (e.g., read-only memory (ROM), flash memory, dynamic random access memory (DRAM) such as synchronous DRAM (SDRAM), etc.), a static memory 1106 (e.g., flash memory, static random access memory (SRAM), etc.), and a secondary memory (e.g., a data storage device 1116), which may communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. Processing device 1102 is configured to execute dynamic review optimizer logic 160 for performing the operations and steps discussed herein. For example, the processing device 1102 may be configured to execute instructions implementing method 700, 710, 720 and 730, for supporting a knowledge search engine platform for enhanced business listings, in accordance with one or more aspects of the disclosure.

Example computer system 1100 may further comprise a network interface device 1122 that may be communicatively coupled to a network 1125. Example computer system 1100 may further comprise a video display 1110 (e.g., a liquid crystal display (LCD), a touch screen, or a cathode ray tube (CRT)), an alphanumeric input device 1112 (e.g., a keyboard), a cursor control device 1114 (e.g., a mouse), and an acoustic signal generation device 1120 (e.g., a speaker).

Data storage device 1116 may include a computer-readable storage medium (or more specifically a non-transitory computer-readable storage medium) 1124 on which is stored one or more sets of executable instructions 1126. In accordance with one or more aspects of the disclosure, executable instructions 1126 may comprise executable instructions encoding various functions of the knowledge search engine 160 in accordance with one or more aspects of the disclosure.

Executable instructions 1126 may also reside, completely or at least partially, within main memory 1104 and/or within processing device 1102 during execution thereof by example computer system 1100, main memory 1104 and processing device 1102 also constituting computer-readable storage media. Executable instructions 1126 may further be transmitted or received over a network via network interface device 1122.

While computer-readable storage medium 1124 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "analyzing," "selecting," "receiving," "presenting," "generating," "deriving," "providing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the disclosure is not limited to any particular programming language. It will be appreciated that a variety of programming languages may be used to implement the teachings of the disclosure.

It is to be understood that the above description is intended to be illustrative, and not restrictive. Many other embodiment examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   receiving, by a processing device of a source system via an application programming interface (API) associated with a third-party provider search system, a search query associated with product brand data submitted by a user device;
   transforming, by a processing device of the source system, the search query into a natural language format inquiry by extracting at least one information element from the search query;
   identifying, by the processing device of the source system, knowledge information from one or more prescribed databases storing the product brand data based on the natural language format inquiry comprising the at least one information element;
   generating, by the processing device of the source system, a user dialog interface to display to the user device to enable a communication to collect additional information to supplement the knowledge information;
   receiving, from the user device via the user dialog interface, the additional information to supplement the knowledge information;
   responsive to receiving the additional information, transmitting by the processing device of the source system to the third-party provider search system, via the API associated with the third-party provider search system, a second communication comprising a recommended update to the third-party provider search system, wherein the recommended update comprises the knowledge information and the additional information; and
   responsive to receiving the additional information, transmitting, by the processing device of the source system, one or more additional communications to a merchant system associated with the product brand data and another third-party provider search system, wherein the one or more additional communications comprises the knowledge information and the additional information.

2. The method of claim 1, wherein the knowledge information indicates a location on the user dialog interface of an event associated with the product brand data.

3. The method of claim 1, wherein the search query comprises at least one of: voice data, text data or a user display gesture received at the user device.

4. The method of claim 1, wherein the user dialog interface comprises at least one of: chat-message interface, search card or an interactive map interface.

5. The method of claim 1, further comprising:
   identifying a gap in the knowledge information associated with the product brand data based on the search query.

6. The method of claim 5, further comprising:
   responsive to identifying the gap, providing the communication to the user device for the additional information regarding the gap in the knowledge information of the product brand data.

7. The method of claim 5, further comprising:
   responsive to identifying the gap, providing a request to the merchant system associated with the product brand data for updated information regarding the gap in the knowledge information.

8. The method of claim 7, further comprising:
   providing the updated information regarding the product brand data to a controller device to verify.

9. A system comprising:
   a memory; and
   a processing device, operatively coupled to the memory, to:
   receive, via an application programming interface (API) associated with a third-party provider search system, a search query associated with product brand data submitted by a user device;
   transform the search query into a natural language format inquiry by extracting at least one information element from the search query;
   identify knowledge information from one or more prescribed databases storing the product brand data based on the natural language format inquiry comprising the at least one information element;
   generate a user dialog interface to display to the user device to enable a communication to collect additional information to supplement the knowledge information;
   receive, from the user device via the user dialog interface, the additional information to supplement the knowledge information;

responsive to receiving the additional information, transmit, via the API associated with the third-party provider search system, a second communication comprising a recommended update to the third-party provider search system, wherein the recommended update comprises the knowledge information and the additional information; and responsive to receiving the additional information, transmit one or more additional communications to a merchant system associated with the product brand data and another third-party provider search system, wherein the one or more additional communications comprises the knowledge information and the additional information.

10. The system of claim 9, wherein the knowledge information indicates a location on the user dialog interface of an event associated with the product brand data.

11. The system of claim 9, wherein the search query comprises at least one of: voice data, text data or a user display gesture received at the user device.

12. The system of claim 9, wherein the user dialog interface comprises at least one of: chat-message interface, search card or an interactive map interface.

13. The system of claim 9, the processing device to identify a gap in the knowledge information associated with the product brand data based on the search query.

14. The system of claim 13, the processing device to, responsive to identifying the gap, provide the communication to the user device for the additional information regarding the gap in the knowledge information.

15. The system of claim 13, the processing device to, responsive to identifying the gap, providing a request to the merchant system associated with the product brand data for update information regarding the gap in the knowledge information.

16. The system of claim 15, the processing device to provide the update information regarding the product brand data to a controller device to verify.

17. A non-transitory computer-readable medium comprising instructions that, when executed by a processing device of a source system, cause the processing device of the source system to:

receive, via an application programming interface (API) associated with a third-party provider search system, a search query associated with product brand data submitted by a user device;

transform the search query into a natural language format inquiry by extracting at least one information element from the search query;

identify knowledge information from one or more prescribed databases storing the product brand data based on the natural language format inquiry comprising the at least one information element;

generate a user dialog interface to display to the user device to enable a communication to collect additional information to supplement the knowledge information;

receive, from the user device via the user dialog interface, the additional information to supplement the knowledge information;

responsive to receiving the additional information, transmit, via the API associated with the third-party provider search system, a second communication comprising a recommended update to the third-party provider search system, wherein the recommended update comprises the knowledge information and the additional information; and responsive to receiving the additional information, transmit one or more additional communications to a merchant system associated with the product brand data and another third-party provider search system, wherein the one or more additional communications comprises the knowledge information and the additional information.

18. The non-transitory computer-readable medium of claim 17, the processing device to:

identify a gap in the knowledge information associated with the product brand data based on the search query.

19. The non-transitory computer-readable medium of claim 18, the processing device is further to:

responsive to identification of the gap, provide the communication to the user device for the additional information regarding the gap in the knowledge information of the product brand data.

20. The non-transitory computer-readable medium of claim 19, wherein the processing device is further to:

provide the additional information regarding the product brand data to a controller device to verify.

* * * * *